(12) United States Patent
Tissafi Drissi

(10) Patent No.: US 11,978,530 B2
(45) Date of Patent: May 7, 2024

(54) SECURE MEMORY

(71) Applicant: STMicroelectronics SA, Montrouge (FR)

(72) Inventor: Faress Tissafi Drissi, Crolles (FR)

(73) Assignee: STMicroelectronics SA, Montrouge (FR)

(*) Notice: Subject to any disclaimer, the term of this patent is extended or adjusted under 35 U.S.C. 154(b) by 218 days.

(21) Appl. No.: 17/556,039

(22) Filed: Dec. 20, 2021

(65) Prior Publication Data

US 2022/0199133 A1 Jun. 23, 2022

(30) Foreign Application Priority Data

Dec. 23, 2020 (FR) ..................................... 2014086

(51) Int. Cl.
*G11C 7/24* (2006.01)
*G11C 11/419* (2006.01)

(52) U.S. Cl.
CPC .............. *G11C 7/24* (2013.01); *G11C 11/419* (2013.01)

(58) Field of Classification Search
CPC ..... G06F 21/79; G11C 7/1051; G11C 7/1078; G11C 11/413; G11C 29/52; G11C 2029/4402; G11C 7/12; G11C 7/106; G11C 7/1087; G11C 16/08; G11C 16/22; G11C 16/26
USPC ....................................................... 365/154
See application file for complete search history.

(56) References Cited

U.S. PATENT DOCUMENTS

| | | | | |
|---|---|---|---|---|
| 6,028,931 | A * | 2/2000 | Kim | ............ G11C 16/22 380/43 |
| 8,634,247 | B1 | 1/2014 | Sprouse et al. | |
| 2002/0163849 | A1* | 11/2002 | Fischer | ............ G11C 7/065 365/230.03 |
| 2014/0047246 | A1 | 2/2014 | Seol et al. | |
| 2019/0362081 | A1 | 11/2019 | Kanno | |
| 2020/0026666 | A1 | 1/2020 | Ju et al. | |
| 2020/0233967 | A1 | 7/2020 | Mondello et al. | |
| 2020/0372949 | A1 | 11/2020 | Zhao et al. | |

FOREIGN PATENT DOCUMENTS

| | | | | |
|---|---|---|---|---|
| CN | 1452077 | * | 4/2003 | ............ G11C 16/22 |
| WO | 2020240237 | A1 | 12/2020 | |

OTHER PUBLICATIONS

INPI Search Report and Written Opinion for priority application (FR 2014086), dated Aug. 11, 2021, 9 pages.

* cited by examiner

*Primary Examiner* — Hoai V Ho
*Assistant Examiner* — Minh Dinh
(74) *Attorney, Agent, or Firm* — Crowe & Dunlevy LLC

(57) ABSTRACT

A memory includes memory cells arranged in rows and in columns, with at least one bit line for each column being coupled to the memory cells of the column. A read/write circuit is coupled to the bit lines and is configured to receive, for each column, a binary datum to be stored in one of the memory cells of the column. The read/write circuit includes, for each column, a latch configured to store a bit of a key, and an encryption circuit configured to encrypt the received binary datum with the bit of the key to provide encrypted binary datum. The read/write circuit controls the bit line to thereby store the encrypted binary datum.

28 Claims, 12 Drawing Sheets

SECURE MEMORY

PRIORITY CLAIM

This application claims the priority benefit of French Application for Patent No. 2014086, filed on Dec. 23, 2020, the content of which is hereby incorporated by reference in its entirety to the maximum extent allowable by law.

TECHNICAL FIELD

The present disclosure generally concerns electronic circuit memories and, in particular, methods and systems for protecting memories against attacks.

BACKGROUND

The data stored in a memory may include critical data. Therefore, it is desired to prevent unauthorized access to such critical data. It is known to encrypt the data stored in a memory using a key, to prevent the unauthorized access to this data. The key itself must, however, not be accessible. There therefore is a need to improve the security of the critical data stored in a memory.

SUMMARY

An embodiment provides a memory having memory cells arranged in rows and in columns, with at least one bit line for each column being coupled to the memory cells of the column, and a read/write circuit coupled to the bit lines and configured to receive, for each column, a binary datum to be stored in one of the memory cells of the column. The read/write circuit includes, for each column, a latch configured to store a bit of a key, and an encryption circuit configured to encrypt the received binary datum with the bit of the key to provide an encrypted binary datum, the read/write circuit being configured to control the bit line to store the encrypted binary datum.

An embodiment also provides a method of data storage in a memory having memory cells arranged in rows and in columns, with at least one bit line for each column being coupled to the memory cells of the column. A read/write circuit is coupled to the bit lines and receives, for each column, a binary datum to be stored into one of the memory cells of the column. The read/write circuit includes, for each column, a latch storing one bit of a key, and a circuit for encrypting the received binary datum with the bit of the key to thereby deliver an encrypted binary datum, the bit line being controlled to store the encrypted binary datum.

According to an embodiment, the read/write circuit includes, for each column, a circuit for detecting the logic level of the bit line, configured to deliver a read binary datum which depends on said logic level. For each column, an operation for reading an encrypted binary datum stored in one of the memory cells of the column successively includes a step of selection of the memory cell, and a step of reading by the detection circuit of the level of the bit line after the elapsing of a first time period. The read/write circuit is configured, for at least one of the columns, to store a bit of the key in the latch associated with the column, the bit of the key corresponding to the binary datum supplied by the detection circuit after the elapsing of a second time period shorter than the first time period.

According to an embodiment, the read/write circuit is configured, for at least one of the columns, to store a bit of the key in the latch associated with the column at the powering-on of the memory, the bit of the key corresponding to the binary datum stored in one of the memory cells of the column at the powering-on of the memory According to an embodiment, the read/write circuit is configured, for each column, on request, to decrypt the encrypted datum stored in one of the memory cells of the column and deliver the decrypted binary datum.

According to an embodiment, the read/write circuit is configured, for each column, on request, to directly deliver the encrypted binary datum stored in one of the memory cells of the column.

According to an embodiment, the read/write circuit is configured, for each column, to deliver, on request, the bit of the key stored in the latch associated with the column.

According to an embodiment, each column includes sub-columns of memory cells. During a write operation, the binary datum received for each column is encrypted and the encrypted binary datum is stored in the memory cell of one of the sub-columns only.

According to an embodiment, during a write operation, either one of the bits of the key or one of the inverse of the bits of the key is used to encrypt the received binary datum when the sub-column is of an odd rank, and the other of the bit of the key and the inverse of the bit of the key is used to encrypt the received binary datum when the sub-column is of an even rank.

According to an embodiment, the read/write circuit includes, for each column, an additional latch configured to store a bit of an additional key. During a write operation, either one of the bits of the key or one of the bits of the additional key is used to encrypt the received binary datum when the sub-column is of an odd rank, and the other is used to encrypt the received binary datum when the sub-column is of an even rank.

According to an embodiment, the rows of memory cells are distributed in first rows and in second rows. The read/write circuit includes, for each column, an additional latch configured to store a bit of an additional key. During a write operation, one of the bits of the key, or one of the bits of the additional key, or the inverse of one of the bits of the key, or the inverse of one of the bits of the additional key is used to encrypt the received binary datum when the sub-column is of an odd rank and the selected row is one of the first rows. Another one of the bits of the key, or another one of the bits of the additional key, or the inverse of another one of the bits of the key, or the inverse of another one of the bits of the additional key is used to encrypt the received binary datum when the sub-column is of an even rank and the selected row is one of the first rows. Still another one of the bits of the key, or another one of the bits of the additional key, or the inverse of another one of the bits of the key, or the inverse of another one of the bits of the additional key is used to encrypt the received binary datum when the sub-column is of an odd rank and the selected row is one of the second rows. Still another one of the bits of the key, or another one of the bits of the additional key, or the inverse of another one of the bits of the key, or the inverse of another one of the bits of the additional key is used to encrypt the received binary datum when the sub-column is of even rank and the selected row is one of the second rows.

According to an embodiment, each latch comprises a first three-state inverter, an inverter in series with a first three-state inverter, and a second three-state inverter in antiparallel with the inverter.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular . . .

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Further, a signal which alternates between a first constant state, for example, a logic low state, noted "0", and a second constant state, for example, a logic high state, noted "1", is called a "binary signal". The high and low states of different binary signals of a same electronic circuit may be different. In practice, the binary signals may correspond to voltages or to currents which may not be perfectly constant in the high or low state.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a . . . in a normal position of use.

Unless specified otherwise, the expressions "around", "approximately", "substantially" and "in the order of" signify within 10%, and preferably within 5%.

In the following description, the source and the drain of a MOS transistor are called "power terminals" or "conduction terminals" of that MOS transistor.

Figure 1:
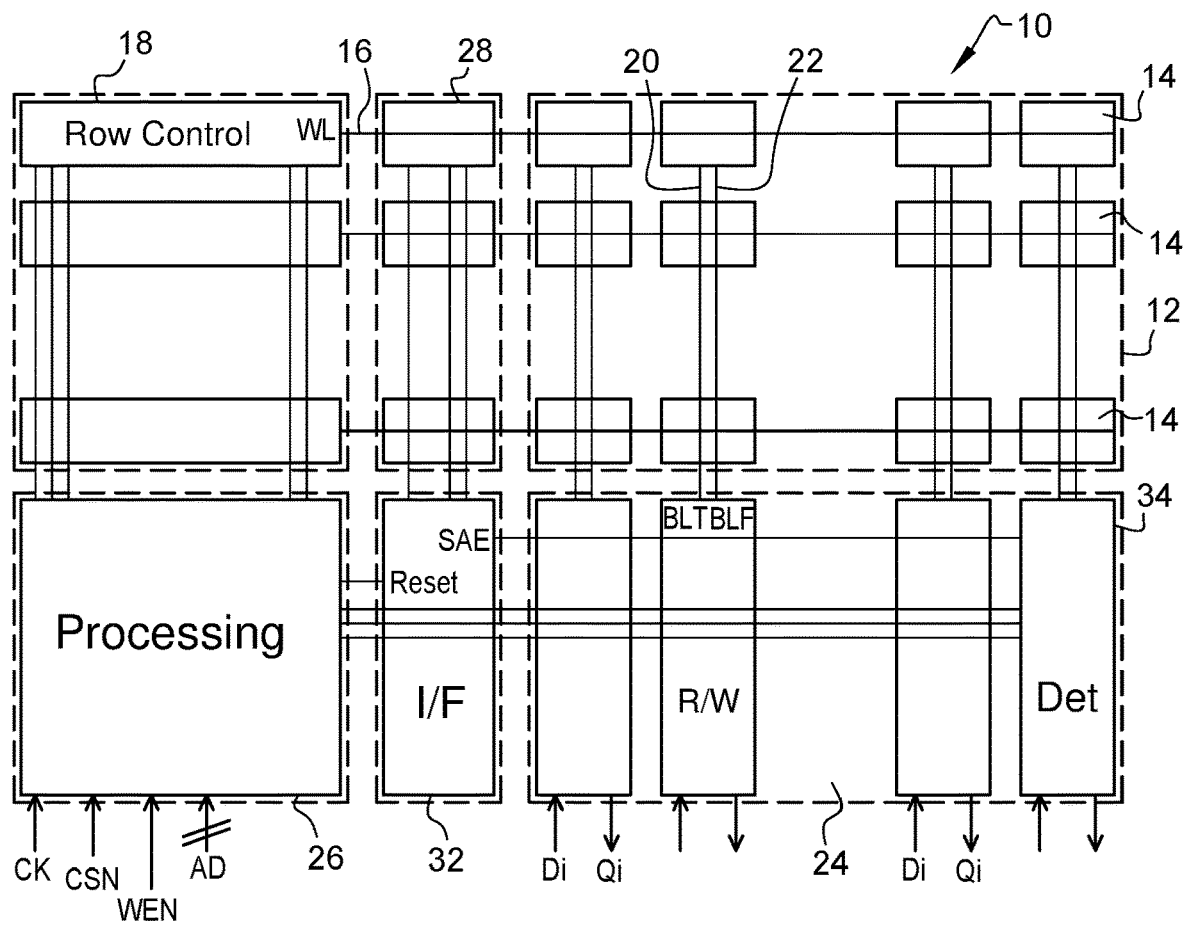
FIG. 1 partially and schematically shows an example of a random access memory (RAM) described herein.

FIG. 1 shows a partial simplified embodiment of a random access memory (RAM) 10. Memory 10 comprises: an array 12 of memory cells 14 arranged in rows and in columns; for each row, a word line 16 coupled to the memory cells 14 in the row; a row control circuit 18 configured to control word lines 16, receiving a digital row address signal AD, and delivering on each word line 16 a binary selection signal WL; and for each column, two bit lines 20 and 22 coupled to the memory cells 14 of the column respectively receiving binary signals BLT and BLF.

Memory 10 further comprises: a read/write (R/W) circuit 24 coupled to the bit lines 20 and 22 of all the columns; a processing circuit 26 receiving a binary clock signal CK, binary control signals CSN (chip select), WEN (write enable) for a read or write operation, digital address signal AD, the processing circuit 26 being configured to transmit digital address signal AD to row control circuit 18 and to transmit control signals for a read or write operation to read/write circuit 24; a column of dummy memory cells 28; and an interface circuit 32, coupled to processing circuit 26, read/write circuit 24, and dummy memory cells column 28, the interface (I/F) circuit 32 configured to transmit to read/write circuit 24 a binary signal SAE (sense amp enable) used in a read operation and to transmit to processing circuit 26 a binary signal Reset indicating the end of a read operation.

Read/write circuit 24 is configured to receive, for each column, a binary datum Di to be written into the memory cell 14 of the column and of the row corresponding to address signal AD, and is configured to control bit lines 20 and 22 according to binary datum Di to bring the storage of the binary datum into the memory cell 14 of the column and of the row corresponding to address signal AD. Read/write circuit 24 is further configured to deliver, for each column, a binary datum Qi read from the memory cell 14 of the row corresponding to address signal AD. Read/write circuit 24 comprises, for each column, a detection circuit (Det) 34 configured to deliver a binary datum at a logic "0" or at a logic "1" from the difference between signals BLT and BLF.

The operation of memory 10 is rated by clock signal CK.

Figure 2:
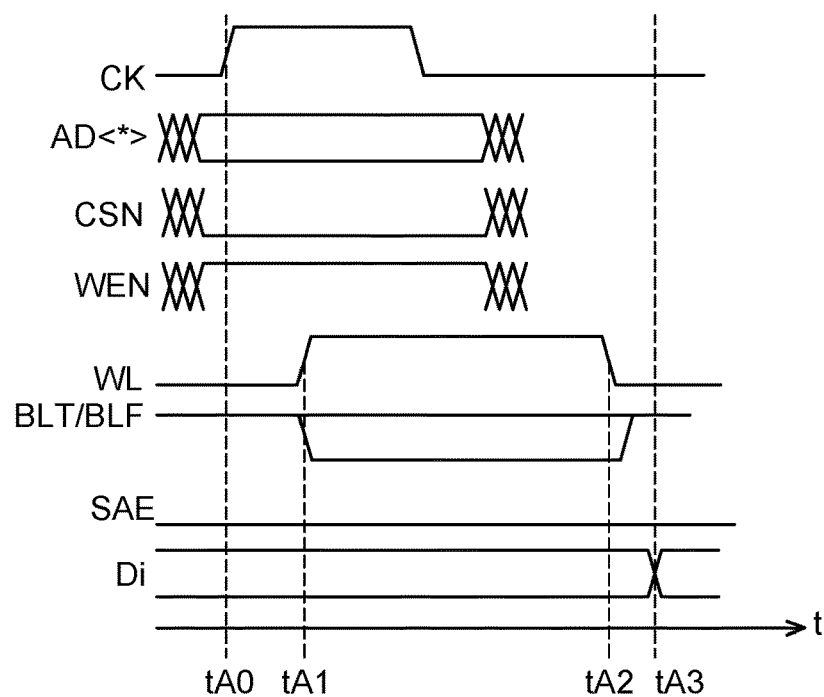
FIG. 2 shows the timing diagram of signals of the memory of FIG. 1 during a write operation.

FIG. 2 shows timing diagrams of signals of the memory 10 of FIG. 1 during a write operation. Times tA0, tA1, tA2, tA3 are successive times.

Time tA0 corresponds to a rising edge of clock signal CK. Before time tA0, binary signal CSN is set to a logic "0" and binary signal WEN is set to a logic "1", controlling a write operation. Signal SAE remains at a logic "0" for the entire write operation. At time tA0, processing circuit 26 transmits to row control circuit 18 the address signal AD designating the memory row into which the write operation is to be performed. At time tA1, row control circuit 18 sets to a logic "1" the selection signal WL for the row corresponding to address signal AD, with the signals WL for the other rows remaining at a logic "0". For each column, read/write circuit 24 sets the signals of column BLT/BLF to a logic "0" or to a logic "1" according to the binary datum Di to be written into each memory cell 14 of the selected row, with signals BLT and BLF being complementary. At time tA2, the row signal WL associated with the selected row switches to a logic "0". At time tA3, the write operation is over.

Figure 3:
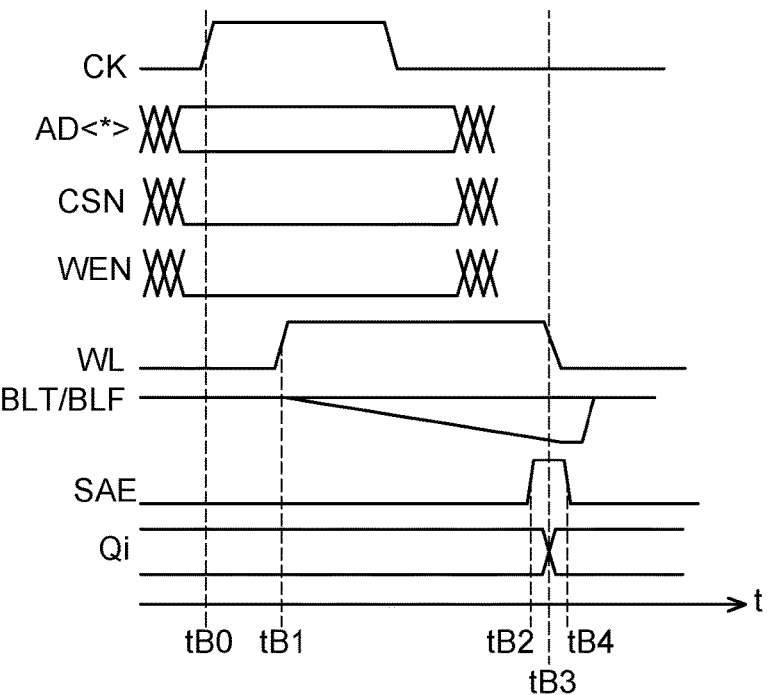
FIG. 3 shows timing diagrams of signals of the memory of FIG. 1 during a read operation.

FIG. 3 shows timing diagrams of signals of the memory 10 of FIG. 1 during a read operation. Times tB0, tB1, tB2, tB3, and tB4 are successive times.

Time tB0 corresponds to a rising edge of signal CK. Before time tB0, binary signal CSN is set to a logic "0" and binary signal WEN is set to a logic "0", controlling a read operation. Read/write circuit 24 sets signals BLT and BLF for each column to a logic "1". At time tB0, processing circuit 26 transmits to row control circuit 18 the address signal AD designating the memory row from which the read operation is to be performed. At time tB1, row control circuit 18 sets the selection signal WL of the row corresponding to address signal AD to a logic "1", and sets the signals WL for the other rows to remain at a logic "0".

For each column, signals BLT and BLF then vary according to the binary datum stored in the memory cell 14 of the selected row, one of signals BLT or BLF switching to a logic "0", the other signal BLT or BLF remaining at a logic "1". For each column, the detection circuit 34 of the read/write circuit delivers a binary datum at a logic "0" or at a logic "1" from the interval between signals BLT and BLF and which corresponds to the binary datum stored in the memory cell 14 of the column and of the selected row. This binary datum further corresponds to the binary datum Qi supplied by read/write circuit 24 at time tB3. The selection signal WL of the selected row switches to a logic "0" and signal SAE is set to a logic "0" at time tB4. To decrease the duration of a read operation, detection circuit 34 is configured to deliver a binary datum at a logic "0" or at a logic "1" even if the two signals BLT and BLF have not each reached the binary state of a logic "0" and a logic "1" yet. The time window for which signal SAE is set to a logic "1" is selected so that the interval between signals BLT and BLF, for each column, is sufficient to ensure that the binary datum supplied by detection circuit 34 is correct. The column of dummy memory cells 28 that may have the same structure as memory cells 14 enables interface circuit 32 to deliver signal SAE, which takes into account the characteristics of memory cells 14.

Figure 4:
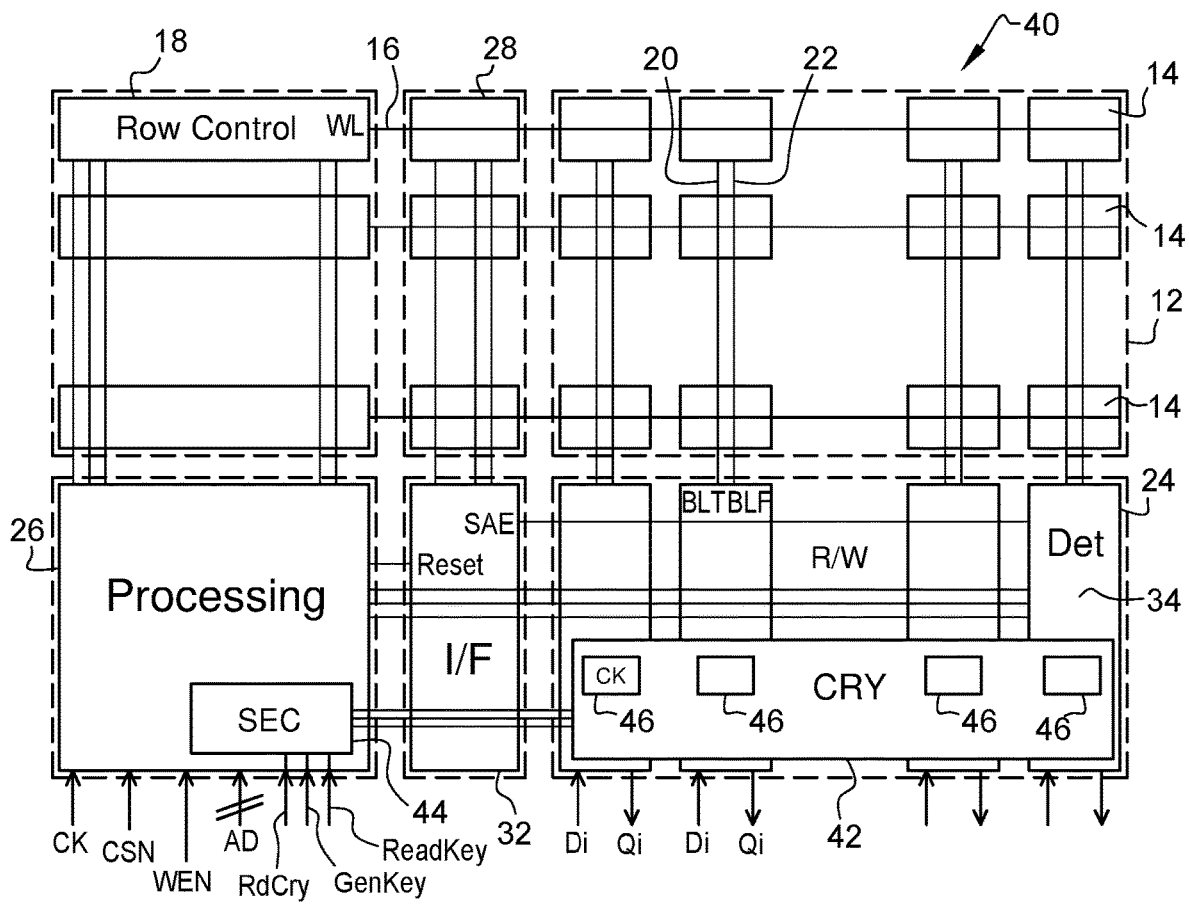
FIG. 4 partially and schematically shows an embodiment of a secure RAM described herein.

FIG. 4 shows a partial simplified embodiment of a RAM 40. RAM 40 comprises all the elements of RAM 10 shown in FIG. 1, with read/write circuit 24 further comprising an encryption/decryption (CRY) circuit 42 and with processing circuit 26 further comprising a security (SEC) circuit 44.

According to an embodiment, the encryption/decryption operations use a key. Read/write circuit 24 further comprises, for each column, a memory cell (CK) 46 having a bit of the key stored therein. According to an embodiment, each memory cell 46 comprises a flip-flop.

Processing circuit 26 further receives a binary signal RdCry, a binary signal GenKey, and a signal ReadKey.

During a write operation, encryption/decryption circuit 42 is configured, for each column, to deliver, from the binary datum Di to be stored, a binary datum X obtained by encryption of binary datum Di with a key. Binary datum X is stored in the memory cell 14 of the column and of the selected row. The timing diagrams of signals CK, AD, CSN, WEN, WL, BLF, BLT, SAE, and Qi of the memory 40 of FIG. 4 during a write operation are identical to the timing diagrams of FIG. 2, with the difference being that, for each column, signals BLF and BLT vary according to the encrypted binary datum X, which is stored in the memory cell 14 of the column and of the selected row and not to binary datum Di.

According to an embodiment, security circuit 44 controls the operation of encryption/decryption circuit 42 according to the value of binary signal RdCry during a read operation. During an operation of reading of the binary data stored in memory 40 from the row corresponding to address signal AD, binary signal RdCry controls whether the binary data which are read are decrypted or are not decrypted. The timing diagrams of signals CK, AD, CSN, WEN, WL, BLF, BLT, SAE, and Qi of the memory 40 of FIG. 4 during a read operation are identical to the timing diagrams of FIG. 3, with the difference being that, for each column, signals BLF and BLT vary according to the encrypted binary datum X, which is stored in the memory cell 14 of the column and of the selected row. This advantageously enables for the protection implemented in the memory by the encryption of the data stored in the memory to be undetectable by a read operation.

According to a first operating mode controlled by signal RdCry, binary data Qi are determined by encryption/decryption circuit 42 by decryption of the encrypted binary data stored in memory 40 by using the key. According to a second operating mode controlled by signal RdCry, binary data Qi directly corresponds to the encrypted binary data stored in memory 40.

The generation of a new value of the key is controlled by signal GenKey.

Figure 5:
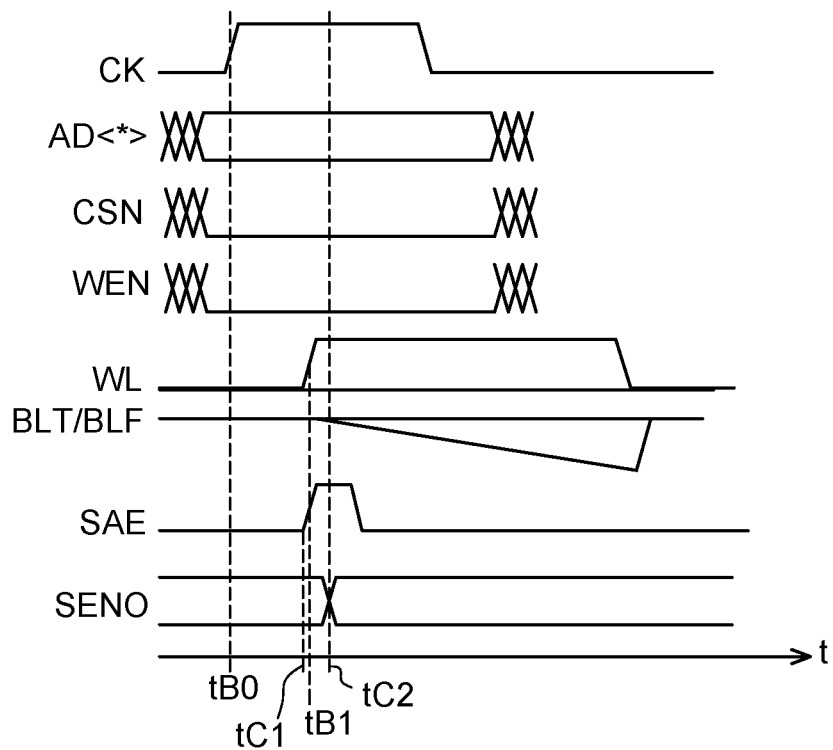
FIG. 5 shows timing diagrams of signals of the memory of FIG. 4 during an embodiment of a key generation method.

FIG. 5 shows timing diagrams of signals of the memory 40 of FIG. 4 according to an embodiment of generation of a new value of the key. According to this embodiment, the generation of a new value of the key is based on a read operation which is modified.

The timing diagrams of FIG. 5 are identical to the timing diagrams of FIG. 3, with the difference being that signal SAE is set to a logic "1" at a time tC1 substantially simultaneously to the time tB1 of setting to a logic "1" of selection signal WL. For each column, the detection circuit 34 of read/write circuit 24 determines, at a time tC2 after time tC1, a binary datum SENO from the interval between signals BLT and BLF. Binary datum SENO is stored in the memory cell 46 associated with the column and corresponds to one of the bits of the key. For each column, signals BLT and BLF start varying from time tB1 according to the binary data stored in the memory cell of the column and of the selected row. Due to the fluctuations of the structures of the memory cells and of detection circuits 34, and due to the fluctuations of the signals present in these elements, the exact values of signals BLF and BLT shortly after time tB1 cannot be known in advance. The time window for which signal SAE is set to a logic "1" is selected to be sufficiently close to tB1 to ensure that the binary datum delivered by detection circuit 34 cannot be known in advance. Thereby, for each column, detection circuit 34 quasi-randomly delivers a signal SENO at a logic "0" or at a logic "1". A new value of the key is thus obtained.

Figure 6:
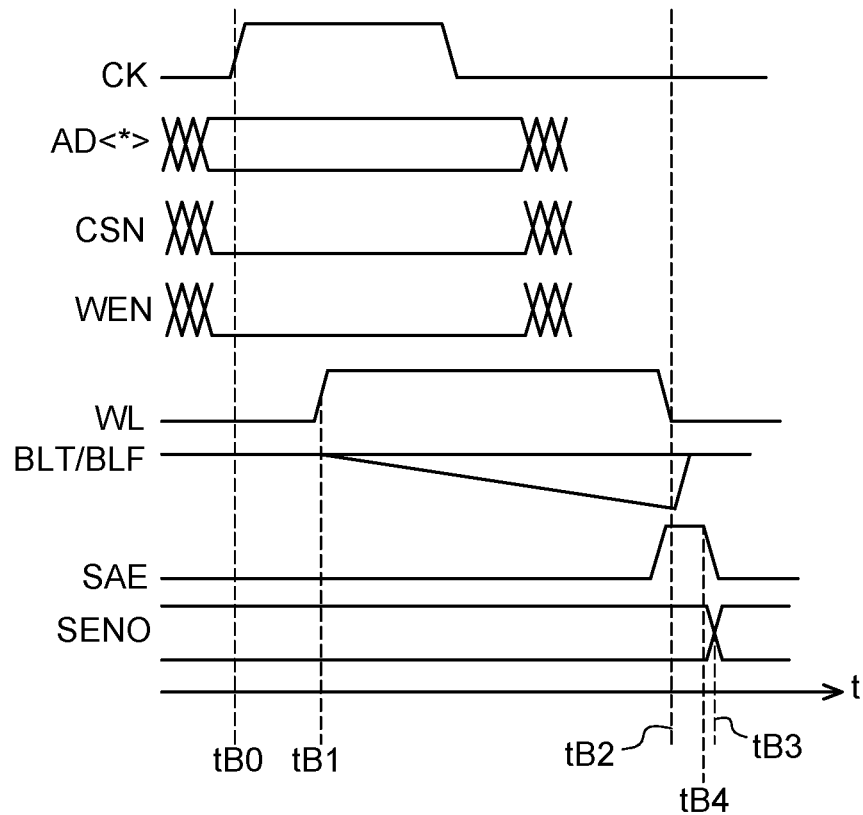
FIG. 6 shows timing diagrams of signals of the memory of FIG. 4 during another embodiment of a key generation method.

FIG. 6 shows timing diagrams of signals of the memory 40 of FIG. 4 according to another embodiment of generation of a new value of the key. According to this embodiment, the generation of a new value of the key is based on an operation of reading of the binary data stored in the memory cells of a row of memory 40 after it is powered on while no write operation has been carried out yet in the memory cells of this row. Indeed, at the powering-on of RAM 40, the binary datum stored in each memory cell 14 stabilizes at a logic "0" or at a logic "1" in unforeseeable and non-reproducible fashion at each powering-on of RAM 40.

The timing diagrams of FIG. 6 are identical to the timing diagrams of FIG. 3 with the difference being that, for each column, the detection circuit 34 of read/write circuit 24 delivers binary datum SENO, which corresponds to the datum read from the memory cell 14 of the column and of the selected row. In FIG. 6, time tB3 has been shown as a variant as being subsequent to time tB4. Binary datum SENO is stored in the memory cell 46 associated with the column and corresponds to one of the bits of the key. A new non-foreseeable value of the key is thus obtained.

According to an embodiment, the memory cells 46 of read/write circuit 24 are distributed into first memory cells and into second memory cells. Each bit of the key stored in one of the first memory cells 46 is obtained according to the implementation of a key generation method previously described in relation with FIG. 5 and each bit of the key stored in one of the second memory cells 46 is obtained according to the implementation of a key generation method previously described in relation with FIG. 6.

Figure 7:
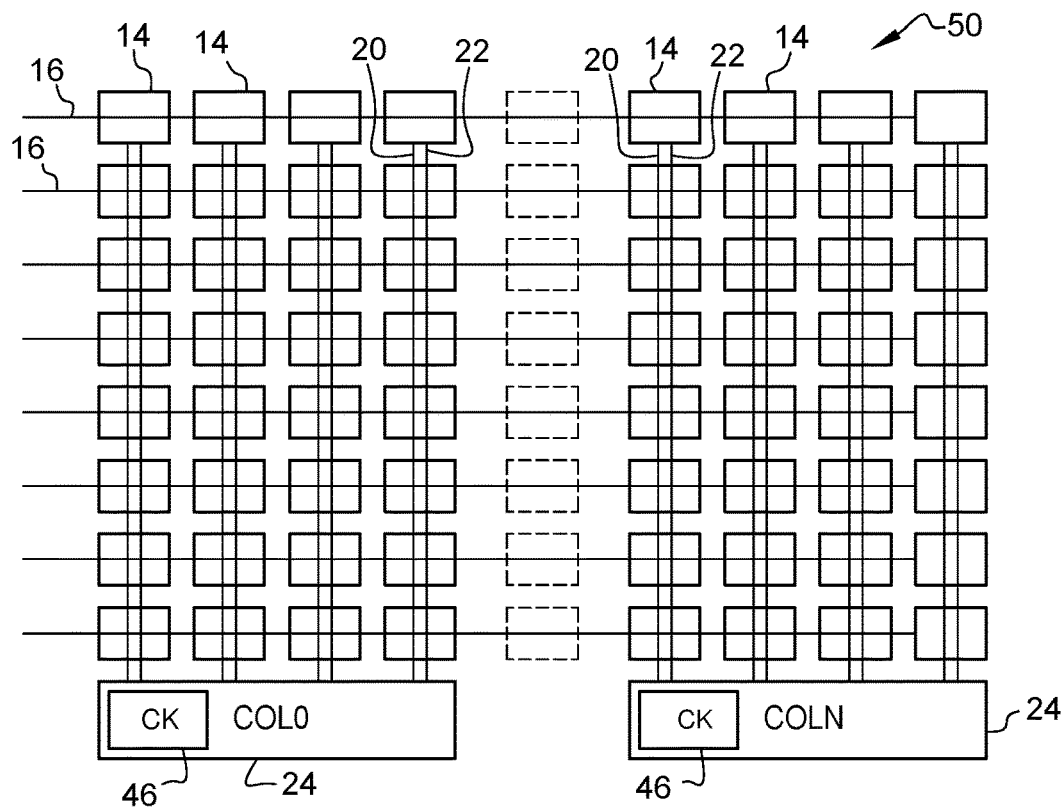
FIG. 7 partially and schematically shows another embodiment of a RAM described herein.

FIG. 7 partially and schematically shows another embodiment of a RAM 50 of the type allowing the storage on each row of more than one binary datum per column. Memory 50 comprises all the elements of RAM 40, with the difference being that for each row, each column comprises more than one memory cell 14, with two columns COL0 and COLN being shown as an example in FIG. 7. As an example, in FIG. 7, four sub-columns of memory cells 14 per column have been shown. For each column, read/write circuit 24 comprises a multiplexer, not shown, coupled to the bit lines 20 and 22 of the sub-columns of memory cells 14. During a read or write operation, for each column, a binary datum is read from or written into one of the sub-columns according to a signal for controlling the multiplexer associated with the column.

According to an embodiment, the read/write circuit 24 comprises a memory cell 46 for each column and a bit of the key is stored memory cell (CK) 46 for each column. The bit of the key is used to encrypt/decrypt a binary datum written into/read from a memory cell 14 of a sub-column of odd rank and the inverse of the bit of the key is used to encrypt/decrypt a binary datum written into/read from a memory cell 14 of a sub-column of even rank.

Figure 8:
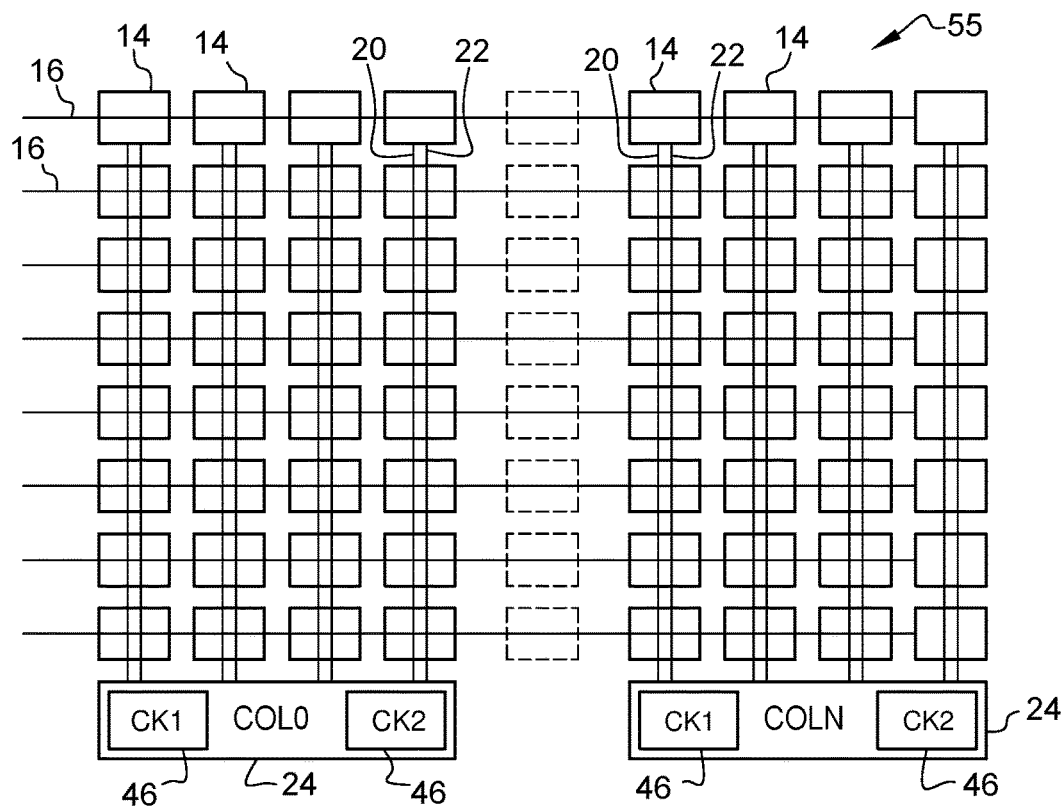
FIG. 8 partially and schematically shows another embodiment of a RAM described herein.

FIG. 8 partially and schematically shows another embodiment of a RAM 55 of the type allowing the storage on each row of more than one binary datum per column. Memory 55 comprises all the elements of memory 50, with the difference being that memory circuit 20 comprises first and second memory cells (CK1, CK2) 46 for each column, and a bit of a first key is stored in the first memory cell 46 and a bit of a second key is stored in the second memory cell 46. The bit of the first key is used to encrypt/decrypt a binary datum written into/read from a memory cell of a sub-column of odd rank and the bit of the second key is used to encrypt/decrypt a binary datum written into/read from a memory cell of a sub-column of even rank.

Figure 9:
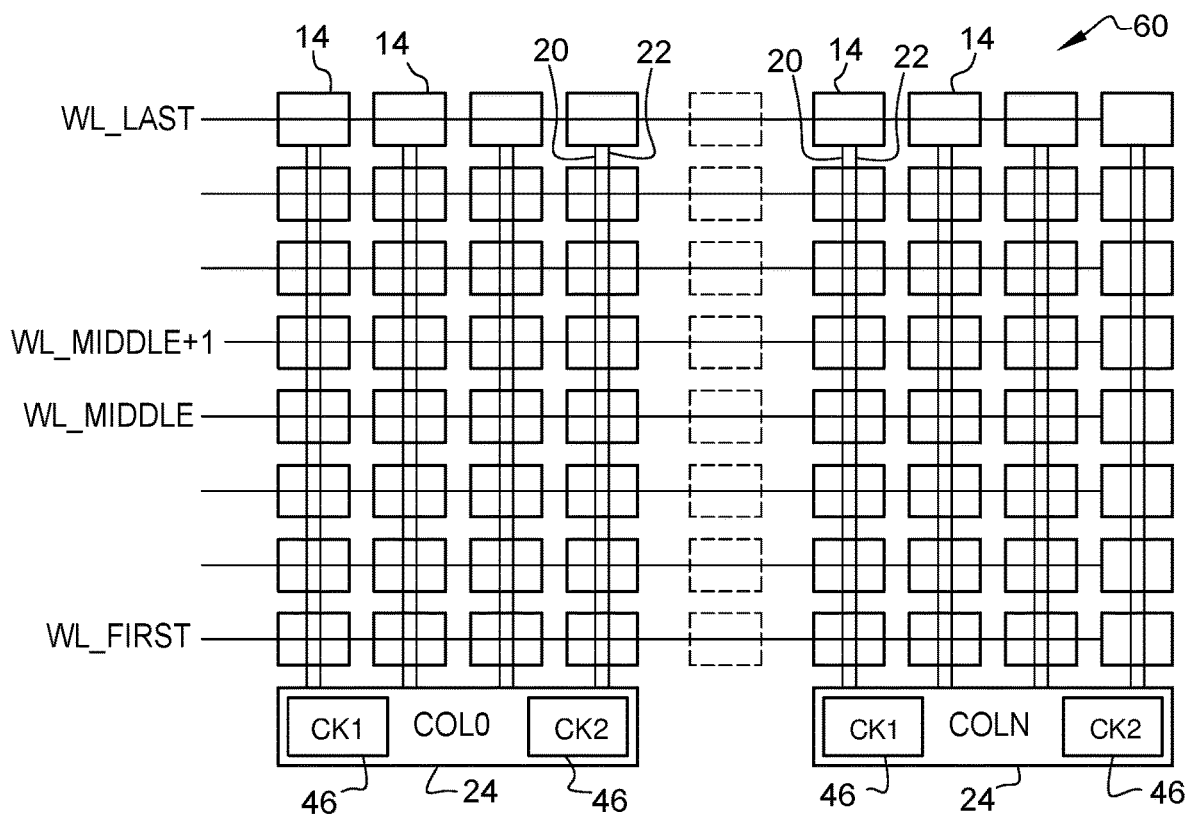
FIG. 9 partially and schematically shows another embodiment of a RAM described herein.

FIG. 9 partially and schematically shows another embodiment of a RAM 60 of the type allowing the storage on each row of more than binary datum per column. Memory 60 comprises all the elements of memory 55. The rows of memory cells 14 are distributed into first successive rows ranging from row WL_FIRST to row WL_MIDDLE, for example comprising the first half of the rows, and into two successive rows, for example comprising the second half of the rows ranging from row WL_MIDDLE+1 to row WL_LAST.

The bit of the first key is used to encrypt/decrypt a binary datum written into/read from a memory cell of a sub-column of odd rank for a first row, and the inverse of the bit of the first key is used to encrypt/decrypt a binary datum written into/read from a memory cell of a sub-column of even rank for a second row. The bit of the second key is used to encrypt/decrypt a binary datum written into/read from a memory cell of a sub-column of odd rank for a first row, and the inverse of the bit of the second key is used to encrypt/decrypt a binary datum written into/read from a memory cell of a sub-column of even rank for a second row.

The reading of the value of key is controlled by signal ReadKey.

Figure 10:
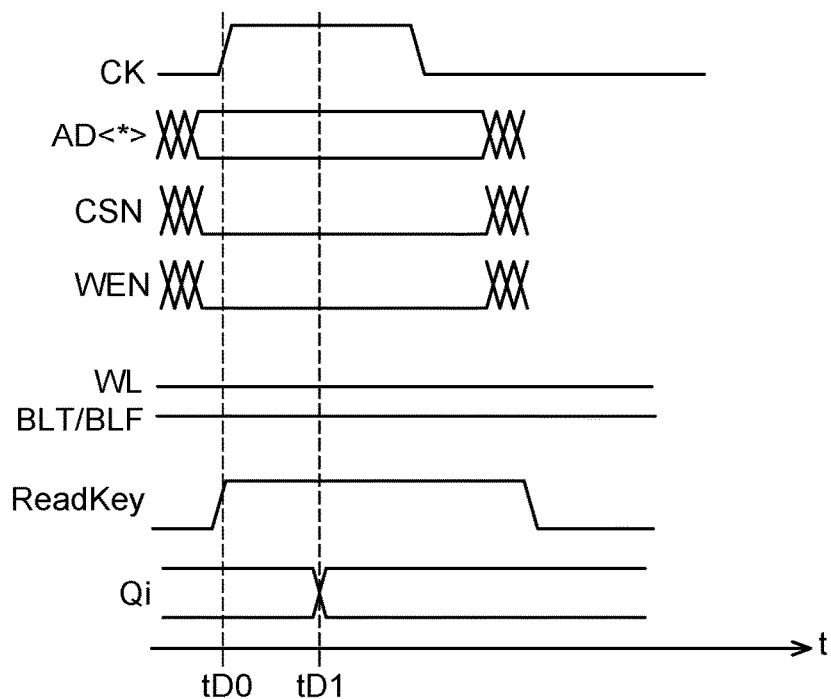
FIG. 10 shows timing diagrams of signals of the memory of FIG. 4 during a key reading operation.

FIG. 10 shows timing diagrams of signals of memory 40 during a key reading operation. Each signal WL, CSN, and WEN remains at a logic "0" during a key reading operation. Time tD0 corresponds to a rising edge of clock signal CLK and to the setting of signal ReadKey to a logic "1". Read/write circuit 20 delivers, at time tD1, for each column, the binary datum Qi which corresponds to the bit of the key associated with the column.

More detailed embodiments of the read/write circuit 24 of RAM 40 will now be described. These embodiments particularly use a circuit MEM for storing a binary datum corresponding to a D latch.

Figure 11:
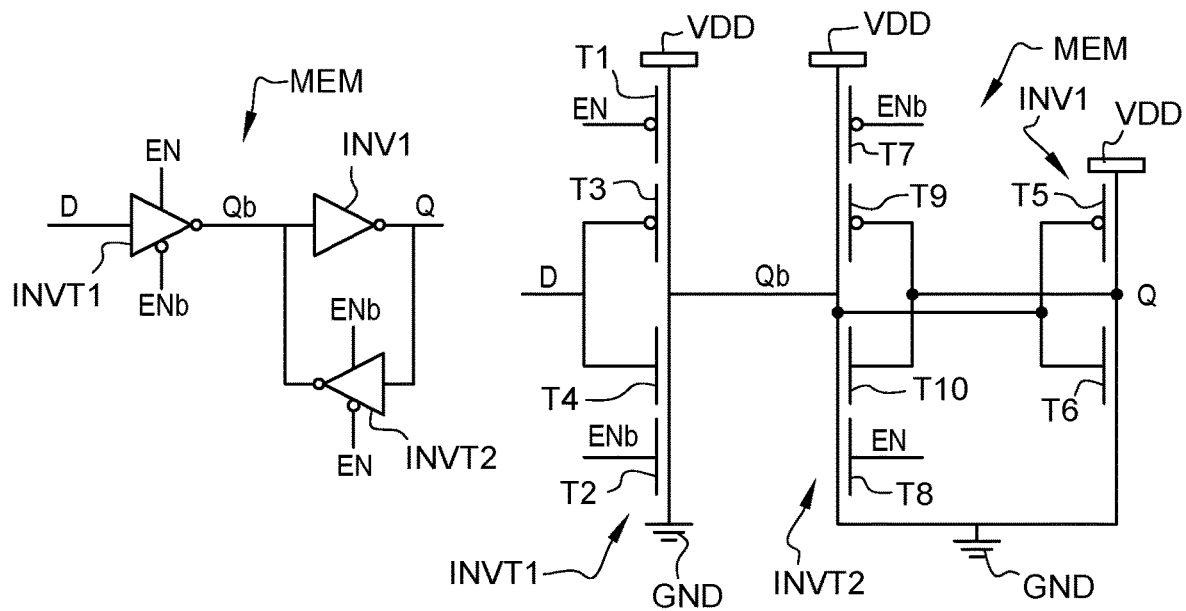
FIG. 11 shows schematic block diagrams of an embodiment of a storage circuit described herein.

FIG. 11 shows, in its left-hand portion, a storage circuit MEM particularly comprising three-state inverters and, in its right-hand portion, a schematic block diagram of such a storage circuit MEM formed with insulated gate field-effect transistors, also called MOS transistors.

A three-state inverter corresponds to a logic circuit which comprises an input receiving a binary signal D, an output delivering a binary signal Q, and an enable node receiving a binary enable signal EN. Generally, a three-state inverter exhibits the following truth table:

TABLE 1

| EN | D | Q |
|---|---|---|
| 0 | 0 | X |
| 0 | 1 | X |
| 1 | 0 | 1 |
| 1 | 1 | 0 |

A three-state inverter most often further comprises a node receiving the inverse ENb of enable signal EN.

As shown in the left-hand portion of FIG. 11, storage circuit MEM comprises a three-state inverter INVT1 having its input receiving binary datum D, and having its output delivering binary datum Qb, which is the inverse of binary datum Q. Three-state inverter INVT1 receives enable signal EN on its enable node (and further receives the inverse ENb of enable signal EN). Storage circuit MEM further comprises an inverter INV1 having its input receiving binary datum Qb and having its output delivering binary datum Q, and a three-state inverter INVT2 having its input receiving binary datum Q and having its output connected to the output of three-state inverter INVT1. Three-state inverter INVT2 receives enable signal ENb on its enable node (and further receives enable signal EN).

Storage circuit MEM operates as follows: when enable signal EN is at a logic "0", the output of storage circuit MEM maintains its state, whatever the state of binary datum D, and when enable signal EN is at a logic "1", storage circuit MEM copies the state of binary datum D at its output, on binary datum Q.

The right-hand portion of FIG. 11 shows an embodiment of storage circuit MEM with MOS transistors.

First three-state inverter INVT1 comprises: a P-channel MOS transistor T1 having its source connected to a source of a high reference potential VDD and having its gate controlled by enable signal EN; an N-channel MOS transistor T2 having its source connected to a source of a low reference potential GND and having its gate controlled by inverse ENb of enable signal EN; a P-channel MOS transistor T3 having its source connected to the drain of transistor T1, having its drain connected to the output node of three-state inverter INVT1 delivering binary datum Qb, and having its gate connected to the input node of the three-state inverter INVT1 receiving binary datum D; and an N-channel MOS transistor T4 having its source connected to the drain of transistor T2, having its drain connected to the output node of three-state inverter INVT1 delivering binary datum Qb, and having its gate connected to the input node of three-state inverter INVT1 receiving binary datum D.

Inverter INV1 comprises: a P-channel MOS transistor T5 having its source connected to the source of high reference potential VDD, having its gate connected to the input node of inverter INV1 delivering binary datum Qb, and having its drain connected to the output node of inverter INV1 delivering binary datum Q; and an N-channel MOS transistor T6 having its source connected to the source of low reference potential GND, having its gate connected to the input node of inverter INV1 receiving binary datum Qb, and having its drain connected to the output node of inverter INV1 delivering binary datum Q.

Second three-state inverter INVT2 comprises: a P-channel MOS transistor T7 having its source connected to the source of high reference potential VDD and having its gate controlled by the inverse ENb of enable signal EN; an N-channel MOS transistor T8 having its source connected to the source of low reference potential GND and having its gate controlled by enable signal EN; a P-channel MOS transistor T9 having its source connected to the drain of transistor T7, having its drain connected to the output node of three-state inverter INVT2 delivering binary datum Qb, and having its gate connected to the input node of three-state inverter INVT2 receiving binary datum Q; and an N-channel transistor T10 having its source connected to the drain of transistor T8, having its drain connected to the output node of three-state inverter INVT2 delivering binary datum Qb, and having its gate connected to the input node of three-state inverter INVT2 receiving binary datum Q.

Figure 12:
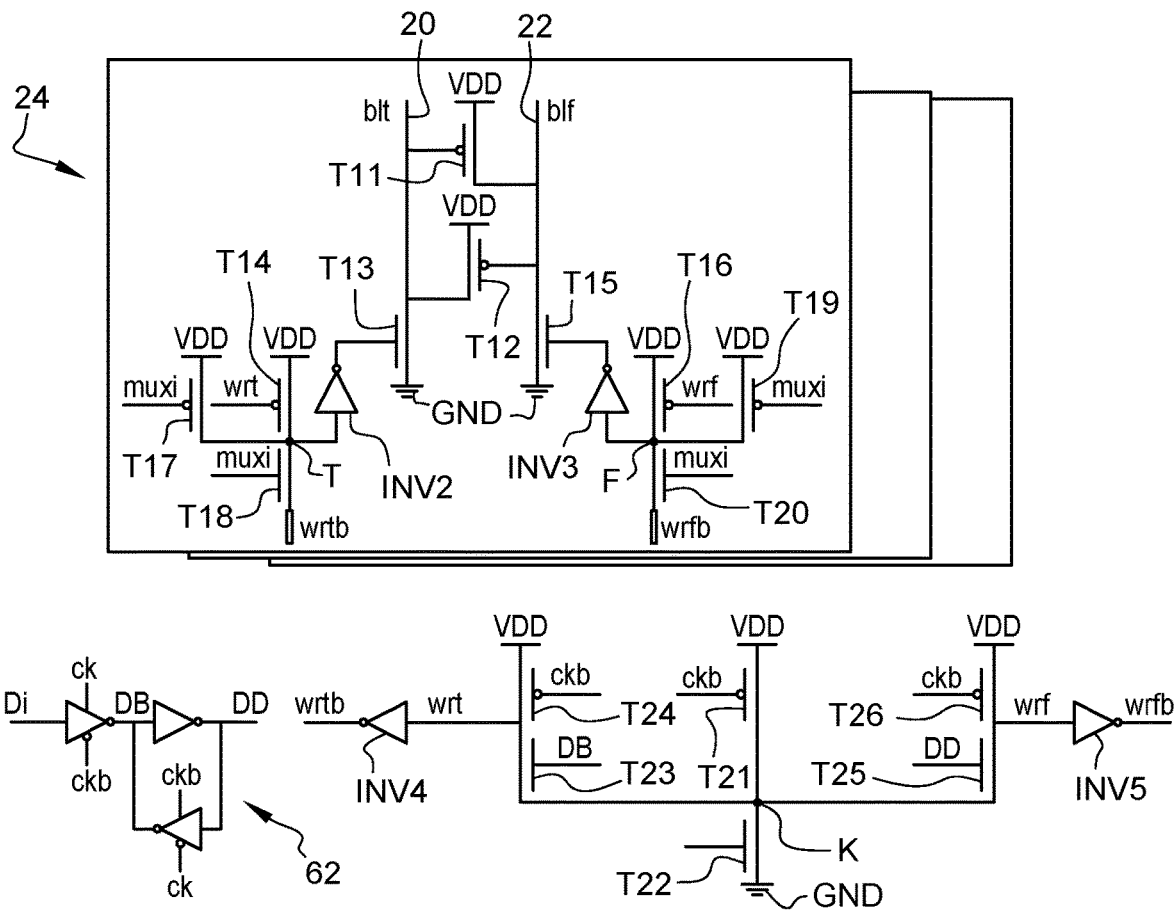
FIG. 12 shows a schematic block diagram of a portion of an embodiment of the memory of FIG. 7.

FIG. 12 shows a more detailed example of certain elements of the read/write circuit 24 of memory 40 used for the writing of binary datum Di into a memory cell 14.

FIG. 12 shows bit line 20 receiving signal blt and bit line 22 receiving signal blf from a sub-column of a column of the memory.

Read/write circuit 24 comprises, for each sub-column: a P-channel MOS transistor T11 having its gate coupled, preferably connected, to bit line 20, having its source coupled, preferably connected, to the source of high reference potential VDD and having its drain coupled, preferably connected, to bit line 22; a P-channel MOS transistor T12 having its gate coupled, preferably connected, to bit line 22, having its source coupled, preferably connected, to the source of high reference potential VDD, and having its drain coupled, preferably connected, to bit line 20; an N-channel MOS transistor T13 having its drain coupled, preferably connected, to an end of bit line 20 and having its source coupled, preferably connected, to the source of low reference potential GND; and an inverter INV2 having its output coupled, preferably connected, to the gate of transistor T13 and having its input coupled, preferably connected, to a node T.

Read/write circuit 24 further comprises, for each sub-column: a P-channel MOS transistor T14 having its source coupled, preferably connected, to the source of high reference potential VDD, having its drain coupled, preferably connected, to node T, and having its gate controlled by a binary signal wrt; an N-channel MOS transistor T15 having its drain coupled, preferably connected, to an end of bit line 22 and having its source coupled, preferably connected, to the source of low reference potential GND; an inverter INV3 having its output coupled, preferably connected, to the gate of transistor T15 and having its input coupled, preferably connected, to a node F; and a P-channel MOS transistor T16 having its source coupled, preferably connected, to the source of high reference potential VDD, having its drain coupled, preferably connected, to node F, and having its gate controlled by a binary signal wrf.

When RAM 40 only comprises one sub-column per column, node T directly receives the inverse wrtb of signal wrt and node F directly receives the inverse wrfb of signal wrf. When each column comprises a plurality of sub-columns, read/write circuit 24 further comprises, for each sub-column: a P-channel MOS transistor T17 having its source coupled, preferably connected, to the source of high reference potential VDD, having its drain coupled, preferably connected, to node T, and having its gate controlled by a binary signal muxi; an N-channel MOS transistor T18 having its drain coupled, preferably connected, to node T, having its source receiving signal wrtb, and having its gate controlled by signal muxi; a P-channel MOS transistor T19 having its source coupled, preferably connected, to the source of high reference potential VDD, having its drain coupled, preferably connected, to node F, and having its gate controlled by signal muxi; and an N-channel MOS transistor T20 having its drain coupled, preferably connected, to node F, having its source receiving signal wrfb, and having its gate controlled by signal muxi.

Read/write circuit 24 comprises a circuit 62 for delivering binary data DD and DB from the binary datum Di to be written. Circuit 62 has the structure of the storage circuit MEM shown in FIG. 11, enable signal EN corresponding to binary signal ck, binary datum D corresponding to binary datum Di, binary datum Qb corresponding to binary datum DB, and binary datum Q corresponding to binary datum DD.

Read/write circuit 24 further comprises: a P-channel transistor T21 having its source coupled, preferably connected, to the source of high reference potential VDD, having its drain coupled, preferably connected, to a node K, and having its gate controlled by the inverse ckb of signal ck; an N-channel transistor T22 having its source coupled, preferably connected, to the source of GND, having its drain coupled, preferably connected, to node K, and having its gate controlled by the inverse ckb of signal ck; an N-channel transistor T23 having its source coupled, preferably connected, to node K, having its drain delivering binary signal wrt, and having its gate controlled by binary datum DB; and a P-channel transistor T24 having its source coupled, preferably connected, to the source of high reference potential VDD, having its drain coupled, preferably connected, to the drain of transistor T23, and having its gate controlled by the inverse ckb of signal ck.

Read/write circuit 24 further comprises: an inverter INV4 having its input receiving binary signal wrt and having its output delivering the inverse wrtb of signal wrt; an N-channel transistor T25 having its source coupled, preferably connected, to node K, having its drain delivering binary signal wrf, and having its gate controlled by binary datum DD; a P-channel transistor T26 having its source coupled, preferably connected, to the source of high reference potential VDD, having its drain coupled, preferably connected, to the drain of transistor T25, and having its gate controlled by the inverse ckb of signal ck; and an inverter INV5 having its input receiving binary signal wrf and having its output delivering the inverse wrfb of signal wrf.

Signal ck is a binary signal internal to the memory, determined from clock signal CK and from binary signal Reset. As an example, signal ck is set to a logic "0" at each rising edge of signal CK and is set to a logic "1" at each falling edge of signal Reset. During an operation of writing of binary datum Di, when signal ck is set to a logic "1", binary datum DD copies binary datum Di and binary datum DB is the inverse of binary datum Di. As an example, when DD is at a logic "1" and DB is at a logic "0", transistor 25 is on and transistor 23 is off. Signal wrt is set to a logic "1" and signal wrf is set to a logic "0", so that signal blt is set to a logic "0" and signal blf is set to a logic "1".

Figure 13:
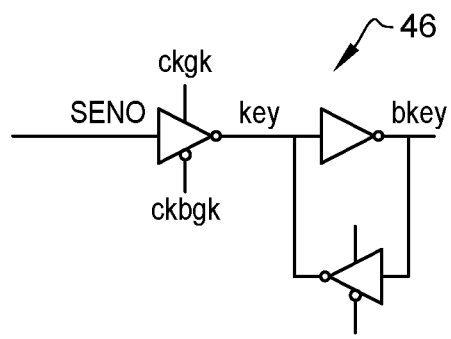
FIG. 13 shows a schematic block diagram of an embodiment of a memory cell for the storage of a bit of the key as described herein.

FIG. 13 shows a schematic block diagram of a memory cell 46 of read/write circuit 24 enabling to store a bit key of the key. Memory cell 46 has the structure of the storage circuit MEM shown in FIG. 11, enable signal EN corresponding to a binary signal ckgk, binary datum D corresponding to binary signal SENO, binary datum Qb corresponding to the bit key of the key, and binary datum Q corresponding to the inverse bkey of the bit key of the key. Memory cell 46 further receives the inverse ckbgk of signal ckgk.

Figure 14:
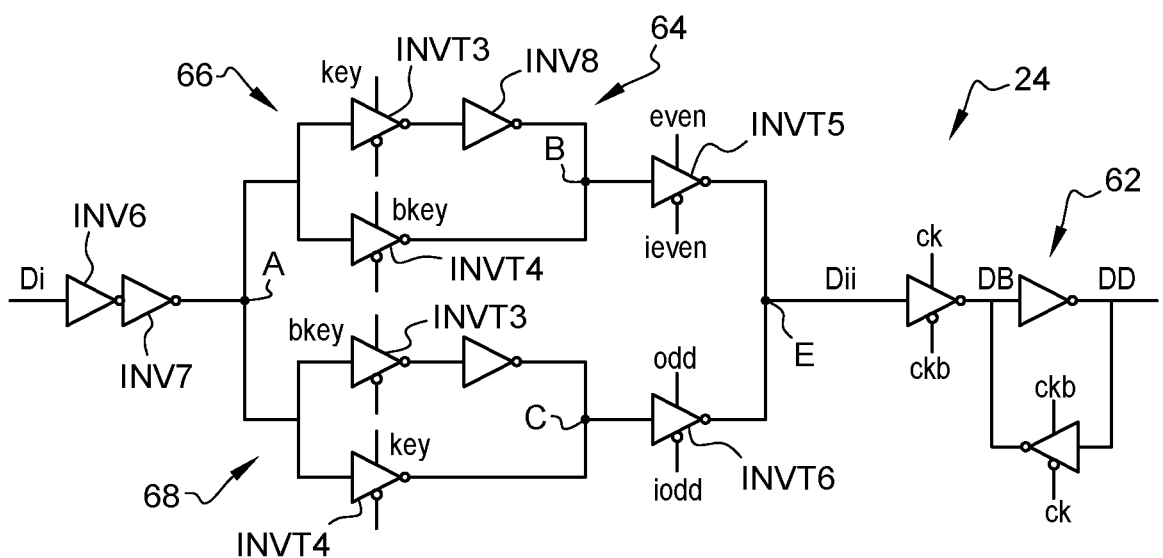
FIG. 14 shows a schematic block diagram of another portion of an embodiment of the memory of FIG. 7.

FIG. 14 shows a schematic block diagram of a portion of the read/write circuit 24 used for the encryption of a binary datum Di to be written into memory 50 enabling to implement the embodiment of the encryption method previously described in relation with FIG. 7.

Read/write circuit 24 comprises, for each column, two inverters INV6 and INV7 in series, the first inverter INV6 receiving binary datum Di and the output of second inverter INV7 being connected to an input node A of an encryption/decryption circuit 64.

Circuit 64 of encryption/decryption 64 comprises an elementary encryption/decryption circuit 66 between node A and a node B and an elementary encryption/decryption circuit 68 between node A and a node C.

Elementary encryption/decryption circuit 66 comprises: a three-state inverter INVT3 having its input connected to node A and receiving the bit key of the key on its enable node (and also receiving the inverse bkey of the bit key of the key); an inverter INV8 having its input receiving the output of three-state inverter INVT3 and having its output connected to a node B; and a three-state inverter INVT4 having its input connected to node A, and receiving the inverse bkey of the bit key of the key on its enable node (and also receiving the bit key of the key), and having its output connected to node B.

Elementary encryption/decryption circuit 68 has the same structure as elementary encryption/decryption circuit 66, with the difference being that the enable node of three-state inverter INVT3 receives the inverse bkey of the bit key of the key and that the enable node of three-state inverter INVT4 receives the bit key of the key.

Circuit 64 of encryption/decryption 64 further comprises: a three-state inverter INVT5 having its input connected to node B, receiving a binary signal even on its enable node (and also receiving the inverse ieven of signal even), and having its output connected to a node E; and a three-state inverter INVT6 having its input connected to node C, receiving a binary signal odd on its enable node (and also receiving the inverse iodd of signal even) and having its output connected to a node D.

Node E delivers a binary datum Dii to the input of circuit 62 for delivering binary data DD and DB.

Elementary encryption/decryption circuit 68 has the same structure as elementary encryption/decryption circuit 66, with the difference being that the enable node of three-state inverter INVT3 receives the inverse bkey of the bit key of the key, that the enable node of three-state inverter INVT4 receives the bit key of the key, and that the enable node of three-state inverter INVT5 receives a binary signal odd on its enable node (and also receives the inverse iodd of signal odd).

When each column of RAM 40 comprises a single sub-column, encryption/decryption circuit 64 comprises the elementary encryption/decryption circuit 66.

Signal even is set to a logic "1" and signal odd is set to a logic "0" for the writing of a binary datum Di into a sub-column of even rank, and signal even is set to a logic "0" and signal odd is set to a logic "1" for the writing of a binary datum Di into a sub-column of odd rank. As an example, for the writing of a datum Di equal to a logic "1" in a sub-column of even rank in the case where bit key is equal to a logic "1", node A is set to a logic "1". Elementary encryption/decryption circuit 66 delivers a logic "1" to node B and elementary encryption/decryption circuit 68 delivers a logic "0" to node C. The state at node E is imposed by three-state inverter INVT5, which is set to a logic "0".

Figure 15:
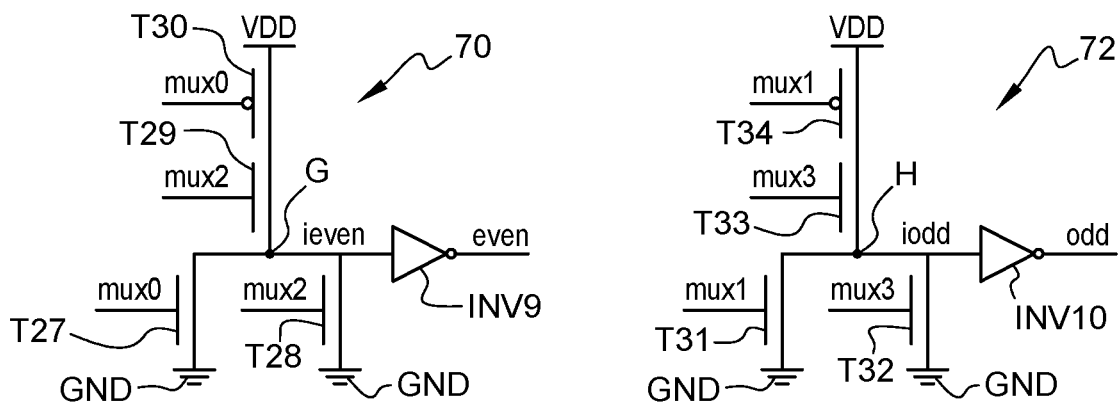
FIG. 15 shows a schematic block diagram of another portion of an embodiment of the memory of FIG. 7.

FIG. 15 shows schematic block diagrams of circuits 70 and 72 configured for the delivery of signals even and odd when each column comprises four sub-columns. Each sub-column has an associated binary signal mux0, mux1, mux2, and mux3, which is at a logic "1" when the corresponding sub-column is to be selected and is at a logic "0" in the opposite case.

Circuit 70 comprises: an N-channel MOS transistor T27 having its source coupled, preferably connected, to the source of low reference potential GND, having its drain coupled, preferably connected, to a node G which delivers binary signal ieven, and having its gate receiving binary signal mux0; an N-channel MOS transistor T28 having its source coupled, preferably connected, to the source of low reference potential GND, having its drain coupled, preferably connected, to node G, and having its gate receiving binary signal mux2; an N-channel MOS transistor T29 having its source coupled, preferably connected, to node G, and having its gate receiving binary signal mux2; a P-channel MOS transistor T30 having its source coupled, preferably connected, to the source of high reference potential VDD, having its drain coupled, preferably connected, to the drain of transistor T29, and having its gate receiving binary signal mux0; and an inverter INV9 receiving signal ieven and delivering signal even.

Circuit 72 comprises: an N-channel MOS transistor T31 having its source coupled, preferably connected, to the source of low reference potential GND, having its drain coupled, preferably connected, to a node H which delivers binary signal iodd, and having its gate receiving binary signal mux1; an N-channel MOS transistor T32 having its source coupled, preferably connected, to the source of low reference potential GND, having its drain coupled, preferably connected, to node H, and having its gate receiving binary signal mux3; an N-channel MOS transistor T33 having its source coupled, preferably connected, to node H, and having its gate receiving binary signal mux3; a P-channel MOS transistor T34 having its source coupled, preferably connected, to the source of high reference potential VDD, having its drain coupled, preferably connected, to the drain of transistor T33, and having its gate receiving binary signal mux1; and an inverter INV10 receiving signal iodd and delivering signal odd.

Figure 16:
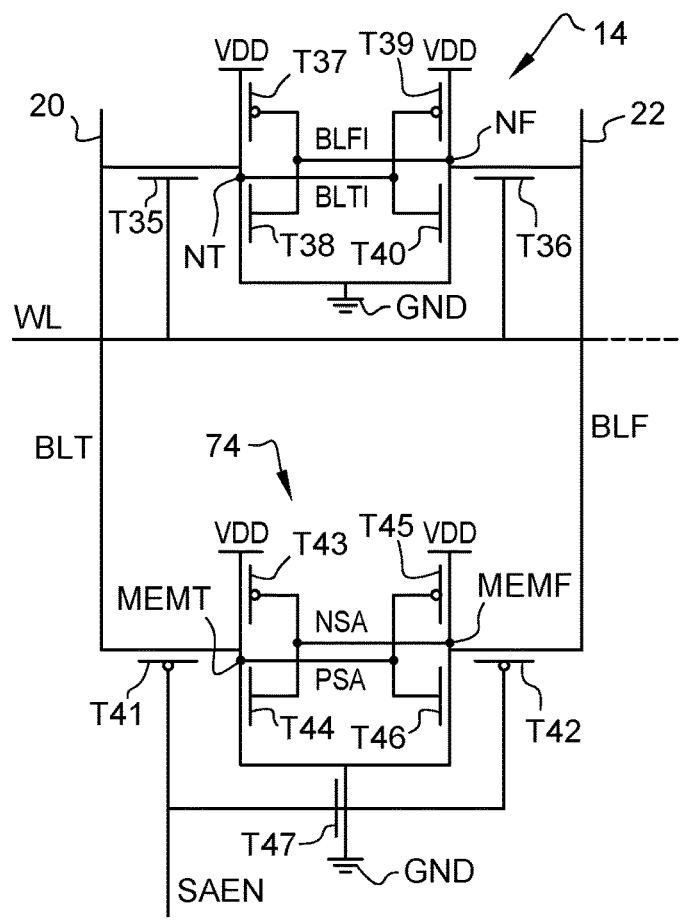
FIG. 16 shows a schematic block diagram of a portion of an embodiment of the memory of FIG. 4.

FIG. 16 shows schematic block diagrams of an embodiment a portion of RAM 40. In FIG. 16, a memory cell 14 and a portion of the read/write circuit 24 used during a read operation have been shown.

Memory cell 14 comprises: two storage nodes NT and NF; an N-channel MOS transistor T35 having one of its power terminals connected to the bit line 20 receiving signal BLT, having the other one of its power terminals connected to node NT, and having its gate receiving row selection signal WL; an N-channel MOS transistor T36 having one of its power terminals connected to the bit line 22 receiving signal BLF, having the other one of its power terminals connected to node NF, and having its gate receiving row selection signal WL; a P-channel MOS transistor T37 having its source connected to the source of high reference potential VDD, having its drain connected to node NT, and having its gate connected to node NF; an N-channel MOS transistor T38 having its source coupled to the source of low reference potential GND, having its drain connected to node NT, and having its gate connected to node NF; a P-channel MOS transistor T39 having its source connected to the source of high reference potential VDD, having its drain connected to node NF, and having its gate connected to node NT; and an N-channel MOS transistor T40 having its source coupled to the source of low reference potential GND, having its drain connected to node NF, and having its gate connected to node NT.

Read/write circuit 24 comprises, for each column, a memory cell 74 used, in particular, for the reading of the datum stored in the selected memory cell 14 of the column. Memory cell 74 comprises: a storage node MEMT delivering binary signal PSA and a storage node MEMF delivering binary signal NSA; a P-channel MOS transistor T41 having one of its conduction terminals connected to the bit line 20 receiving signal BLT, having the other one of its conduction terminals connected to node MEMT, and having its gate receiving a binary signal SAEN; a P-channel MOS transistor T42 having one of its conduction terminals connected to the bit line 22 receiving signal BLF, having the other one of its conduction terminals connected to node MEMF, and having its gate receiving the inverse SAEN of signal SAE; a P-channel MOS transistor T43 having its source connected to the source of high reference potential VDD, having its drain connected to node MEMT, and having its gate connected to node MEMF; an N-channel MOS transistor T44 having its drain connected to node MEMT, and having its gate connected to node MEMF; a P-channel MOS transistor T45 having its source connected to the source of high reference potential VDD, having its drain connected to node MEMF, and having its gate connected to node MEMT; an N-channel MOS transistor T46 having its drain connected to node MEMF, and having its gate connected to node MEMT; and an N-channel MOS transistor T47 having its source connected to the source of low reference potential GND, having its drain connected to the sources of transistors T44 and T46, and having its gate receiving the inverse SAEN of signal SAE.

Figure 17:
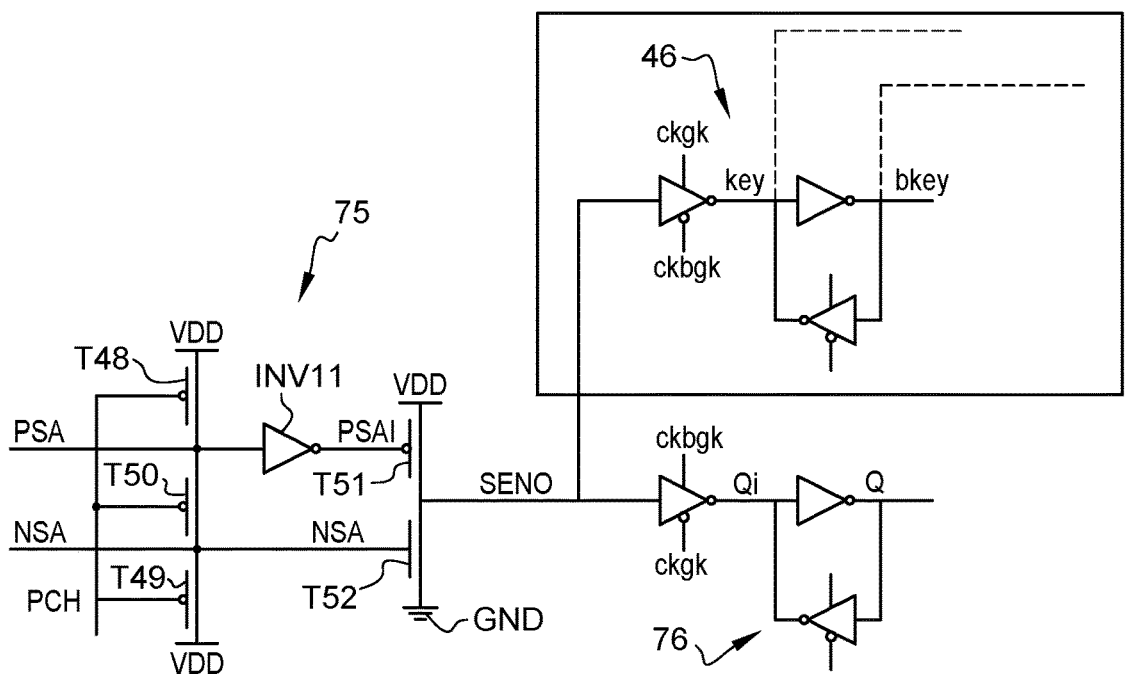
FIG. 17 shows a schematic block diagram of another portion of an embodiment of the memory of FIG. 4.

FIG. 17 shows a schematic block diagram of an embodiment of a circuit 75 for delivering the binary datum read for a column of read/write circuit 24. Circuit 75 comprises: a P-channel MOS transistor T48 having its source coupled, preferably connected, to the source of high reference potential VDD, having its drain coupled, preferably connected, to a node receiving binary signal PSA, and having its gate receiving a binary signal PCH; a P-channel MOS transistor T49 having its source coupled, preferably connected, to the source of high reference potential VDD, having its drain coupled, preferably connected, to a node receiving binary signal NSA, and having its gate receiving binary signal PCH; and a P-channel MOS transistor T50 having its drain or its source coupled, preferably connected, to the drain of transistor T48, having the other one of its drain or of its source coupled, preferably connected, to the drain of transistor T49, and having its gate receiving binary signal PCH.

Circuit 75 further comprises: an inverter INV11 having its input receiving signal PSA and having its output delivering the inverse PSAI of signal PSA; a P-channel MOS transistor T51 having its source coupled, preferably connected, to the source of high reference potential VDD, having its drain coupled, preferably connected, to a node delivering signal SENO, and having its gate receiving binary signal PSAI; an N-channel MOS transistor T52 having its source coupled, preferably connected, to the source of low reference potential GND, having its drain coupled, preferably connected, to the node delivering signal SENO, and having its gate receiving binary signal NSA; the memory cell 46 previously described in relation with FIG. 13 receiving signal SENO; and a storage circuit 76 having the structure of the storage circuit MEM shown in FIG. 11, enable signal EN corresponding to binary signal ckbgk, binary datum D corresponding to binary signal SENO, binary datum Qb corresponding to binary datum Qi, and binary datum Q corresponding to binary datum Q.

Signal PCH is a binary signal set to a logic "1" for a window containing the window for which signal WL is set to a logic "1" during a read operation.

The circuits illustrated in FIGS. 16 and 17 may be implemented for the generation, for each column, of the bit key of the key according to the embodiment previously described in relation with FIGS. 5 and 6.

Figure 18:
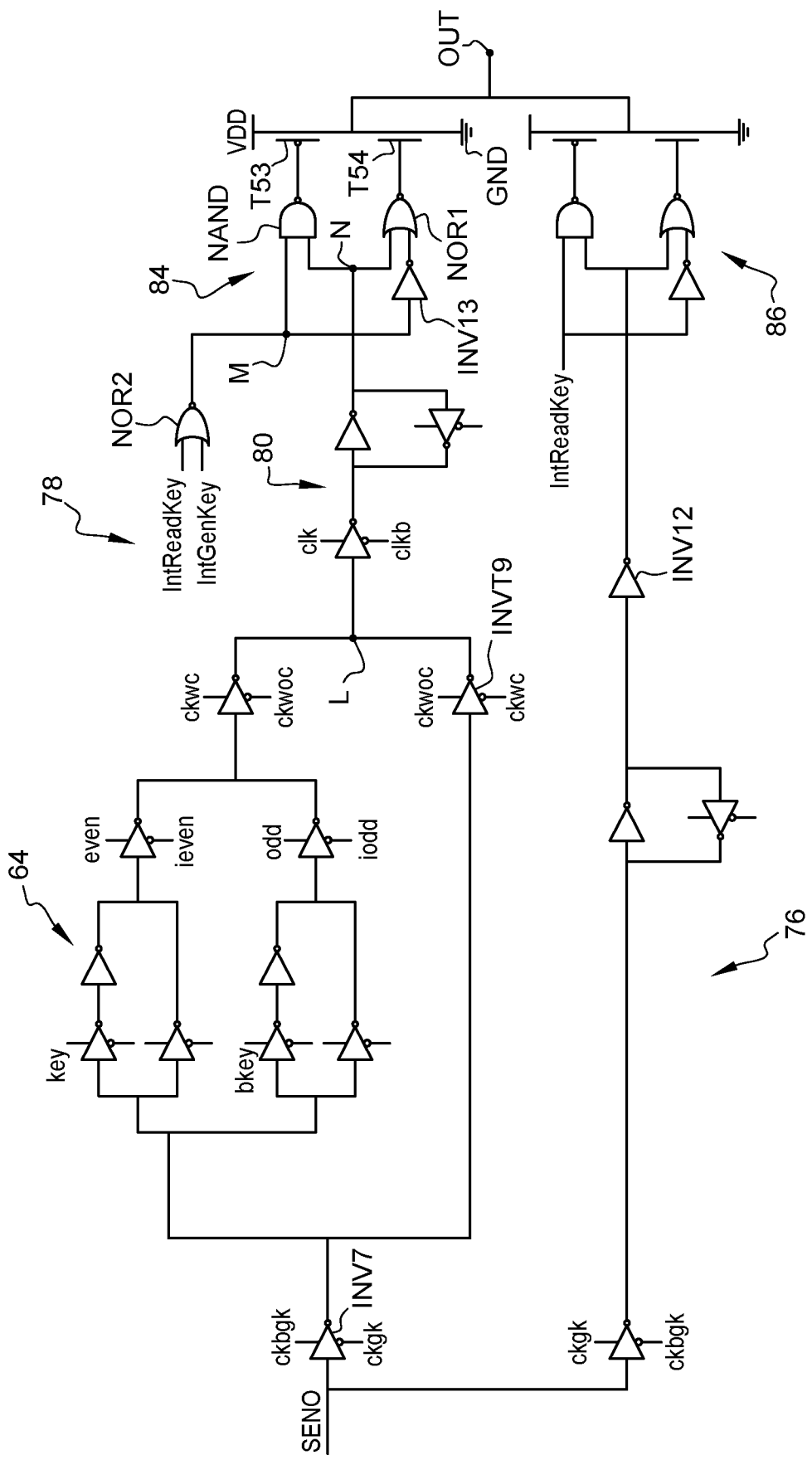
FIG. 18 shows a schematic block diagram of another portion of an embodiment of the memory of FIG. 4.

FIG. 18 shows a schematic block diagram of a read circuit 78 of read/write circuit 24. Read circuit 78 comprises for each column: a three-state inverter INVT7 receiving binary signal SENO and receiving the inverse ckbgk of signal ckgk on its enable node (and also receiving signal ckgk); a first branch comprising an encryption/decryption circuit 64 such as previously described, having its input receiving the output of three-state inverter INVT7 and a three-state inverter INVT8 having its input receiving the signal supplied by encryption/decryption circuit 64, receiving a signal ckwc on its enable node (and also receiving the inverse ckwoc of signal ckwc) and having its output coupled to a node L; a second branch comprising a three-state inverter INVT9 having its input receiving the signal supplied by three-state inverter INVT7, receiving signal ckwoc on its enable node (and also receiving the inverse ckwc of signal ckwc) and having its output coupled to node L; a storage circuit 80 having the structure of the storage circuit MEM shown in FIG. 11, enable signal EN corresponding to binary signal clk, binary datum D corresponding to binary signal at node L, binary datum Qb corresponding to binary datum Qi, and binary datum Q corresponding to binary datum Q; and the storage circuit 76 previously described in relation with FIG. 17, enable signal EN corresponding to binary signal ckgk, binary datum D corresponding to binary signal SENO, binary datum Qb corresponding to binary datum Qi, and binary datum Q corresponding to binary datum Q.

Read circuit 78 further comprises for each column: an inverter INV12 having its input connected to the output of storage circuit 76; a first selection circuit 84 comprising two input nodes M and N, a NAND logic gate and a NOR logic gate NOR1, each having a first input at the input node N receiving the binary signal delivered by storage circuit 80, the NAND gate having a second input connected to node M, an inverter INV13 having an input connected to node M and an output connected to a second input of NOR logic gat NOR1, a P-channel MOS transistor 53 having its source coupled, preferably connected, to the source of high reference potential VDD, having its drain coupled to an output node OUT of circuit 78, and having its gate connected to the output of the NAND logic gate, and an N-channel MOS transistor 54, having its source coupled, preferably connected, to the source of low reference potential GND, having its drain coupled to the output node OUT of circuit 78, and having its gate connected to the output of logic gate NOR1; a NOR logic gate NOR2 having a first input receiving a binary signal IntReadKey and a second input receiving a binary signal IntGenkey, and having its output connected to node M; and a second selection circuit 86 having the same structure as first selection circuit 84, having its input node M receiving binary signal IntReadKey, having its input node N connected to the output of inverter INV12, and having its output node connected to the output node OUT of circuit 78.

For an operation of reading of a binary datum stored in the memory with a decryption, binary signals IntReadKey and IntGenkey are set to a logic "0", and binary signal ckwc is set to a logic "1", with the inverse ckwoc of binary signal ckwc therefore being set to a logic "0". When signal IntReadKey is at a logic "0", the two MOS transistors 53 and 54 of the second selection circuit 86 are off, so that the second selection circuit 86 has no influence on the state of node OUT. When signal ckwoc is at a logic "0", the three-state inverter INVT9 has no influence on the state of node L. When signal ckbgk switches to a logic "1", the read binary datum SENO is decrypted in the first branch. The binary datum decrypted at node L propagates to first selection circuit 84 when signal clk is set to a logic "1" and is copied on output node OUT.

For an operation of reading of a binary datum stored in the memory with no decryption, binary signals IntReadKey and IntGenkey are set to a logic "0", binary signal ckwc is set to a logic "0", with the inverse ckwoc of binary signal ckwc therefore being set to a logic "1". When signal IntReadKey is at a logic "0", the two MOS transistors 53 and 54 of the second selection circuit 86 are off, so that the second selection circuit 86 has no influence on the state of node OUT. When the signal ckwoc is at a logic "1", three-state inverter INVT8 has no influence on the state of node L. When signal ckbgk switches to a logic "1", the read binary datum SENO is transmitted via the second branch to node L. The non-decrypted binary datum at node L propagates to first selection circuit 84 when signal clk is set to a logic "1" and is copied on output node OUT.

For an operation of reading of the bit key of the key, binary signal IntReadKey is set to a logic "1" and binary signal IntGenkey is set to a logic "0". The two MOS transistors 53 and 54 of first selection circuit 84 are then turned off, so that first selection circuit 84 has no influence on the state of node OUT. When signal ckgk switches to a logic "1", the read binary datum SENO, which then corresponds to the bit key of the key, is transmitted via to second selection circuit 86. When signal IntReadKey is at a logic "1", second selection circuit 86 copies the bit key of the key on output node OUT.

According to an embodiment, security circuit 44 is configured to control the erasing of the binary data stored in the memory cells 14 of memory 40 and the erasing of the bits of the key.

Figure 19:
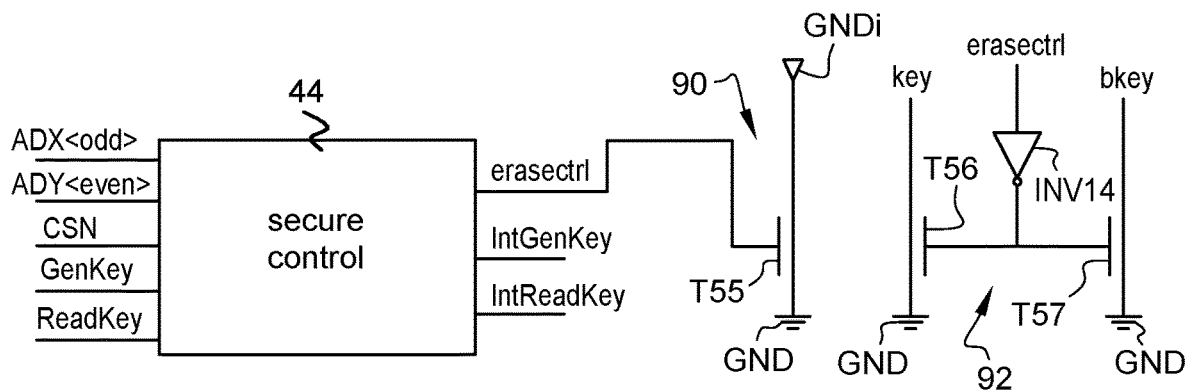
FIG. 19 shows a schematic block diagram of another portion of an embodiment of the memory of FIG. 4.

FIG. 19 shows a schematic block diagram of a portion of memory 40.

According to an embodiment, security circuit 44 (secure control) receives binary signal ReadKey, binary signal GenKey, and binary signal CSN. Security circuit 44 delivers binary signal IntReadKey, binary signal IntGenKey, and a binary signal erasectrl. Security circuit 44 further receives signals representative of the operation of memory 40. As an example, security circuit 44 receives digital signals ADX<odd> and ADY<even> which respectively represent the bits of odd ranks and the bits of even ranks of address signal AD and performs a predefined calculation on these bits enabling to determine whether address signal AD is correct or not.

According to an embodiment, read/write circuit 24 comprises a switch 90 controlled by signal erasectrl and which is interposed between a node GNDi and the source of low reference potential GND. Node GNDi is coupled to each memory cell 14 of array 12 and corresponds to the source delivering the low reference potential for each memory cell 14. When signal erasectrl is at a logic "1", switch 90 is on and the source of low reference potential GND is connected to the node GNDi for delivering the low reference potential of each memory cell 14. When signal erasectrl is at a logic "0", switch 90 is off and the node GNDi for delivering the low reference potential of each memory cell 14 is left floating, causing the erasing of the binary data stored in the memory cells.

According to an embodiment, switch 90 comprises an N-channel MOS transistor 55 having its source coupled, preferably connected, to the node GNDi of each memory cell 14, having its gate receiving signal erasectrl, and having its drain coupled, preferably connected, to the source of low reference potential GND.

According to an embodiment, read/write circuit 24 comprises, for each column, a circuit 92 for erasing the bit key of the key, controlled by signal erasectrl. According to an embodiment, erasing circuit 92 comprises an inverter INV14 having its input receiving signal erasectrl, an N-channel MOS transistor 56, having its source coupled, preferably connected, to the source of low reference potential GND, having its drain coupled, preferably connected, to the output of first three-state inverter INVT1 of the memory cell 46 of the column, and having its gate connected to the output of inverter INV14, and an N-channel MOS transistor 57, having its source coupled, preferably connected, to the source of low reference potential GND, having its drain coupled, preferably connected, to the input of the second three-state inverter INVT2 of memory cell 46, and having its gate connected to the output of inverter INV14. When signal erasectrl is at a logic "1", each transistor 56 and 57 is off. When signal erasectrl is at a logic "0", each transistor 56 and 57 is on, forcing the setting to a logic "0" of the bit key of the key and of the inverse bkey of the bit key of the key.

Figure 20:
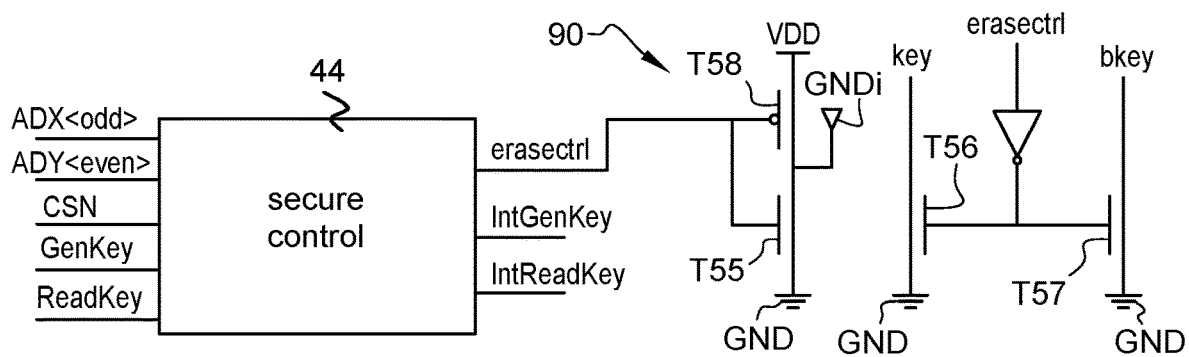
FIG. 20 shows a variant of the schematic block diagram of FIG. 19.

FIG. 20 shows a variant of the schematic block diagram of FIG. 19, where switch 90 further comprises a P-channel MOS transistor T58 having its source coupled, preferably connected, to the source of high reference potential VDD, having its gate receiving signal erasectrl, and having its drain coupled, preferably connected, to the node GNDi of each memory cell 14. When signal erasectrl is at a logic "1", transistor T58 is off. When signal erasectrl is at a logic "0", transistor T58 is on and node GNDi is coupled to the source of high reference potential VDD. This advantageously enables acceleration of the rise of node GNDi to a potential sufficiently high to erase the data stored in memory cells 14.

Figure 21:
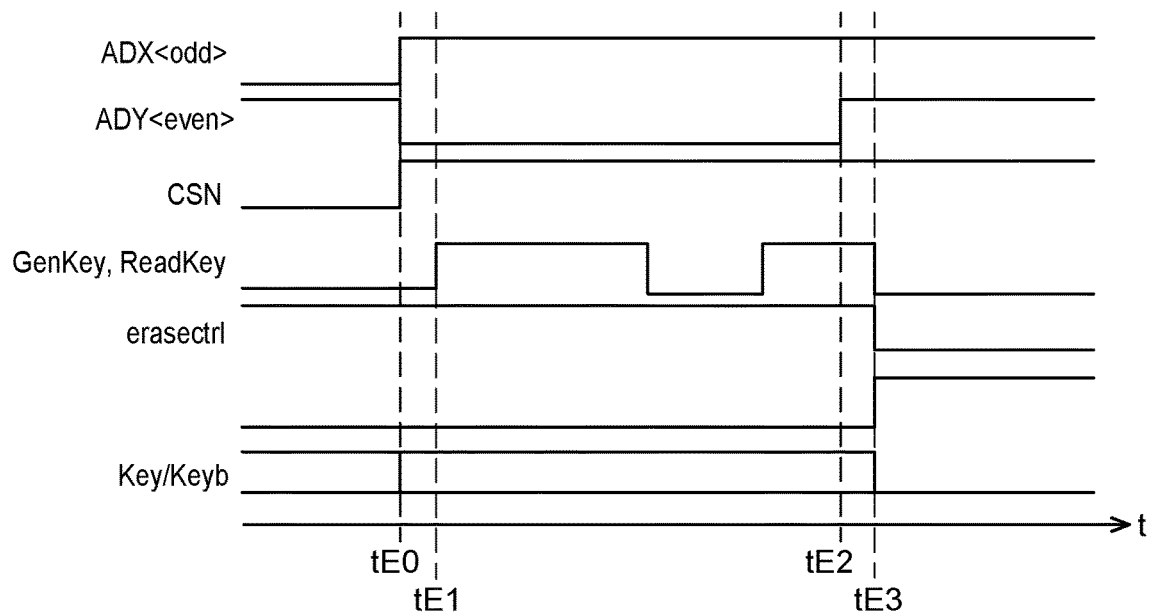
FIG. 21 shows timing diagrams of signals of the circuit of FIG. 19 or 20.

FIG. 21 shows timing diagrams of signals illustrating the operation of security circuit 44. Times tE0, tE1, tE2, and tE3 are successive.

In normal operation, that is, in the absence of a detection of an intrusion attempt, security circuit 44 maintains signal erasectrl at a logic "1", so that switch 90 is on and transistors 56 and 57 are off. At time tE0, signal ADX<odd> is set to a logic "1" and signal ADX<even> is set to a logic "0". At time tE1, signal GenKey or ReadKey is set to a logic "1" for a key generation operation or a key reading operation. This operation is still considered as normal by security circuit 44. At time tE2, signal ADX<even> is set to a logic "1", with signal ADX<odd> still being at a logic "1". At time t3, signal GenKey or ReadKey is set to a logic "1". This operation is considered as abnormal by security circuit 44. Security circuit 44 then sets signal erasectrl to a logic "1", so that switch 90 is off, which causes the erasing of the binary data stored in all the memory cells 14 of memory 40, and transistors 56 and 57 are turned on, which causes the erasing of all the bits key of the key.

Figure 22:
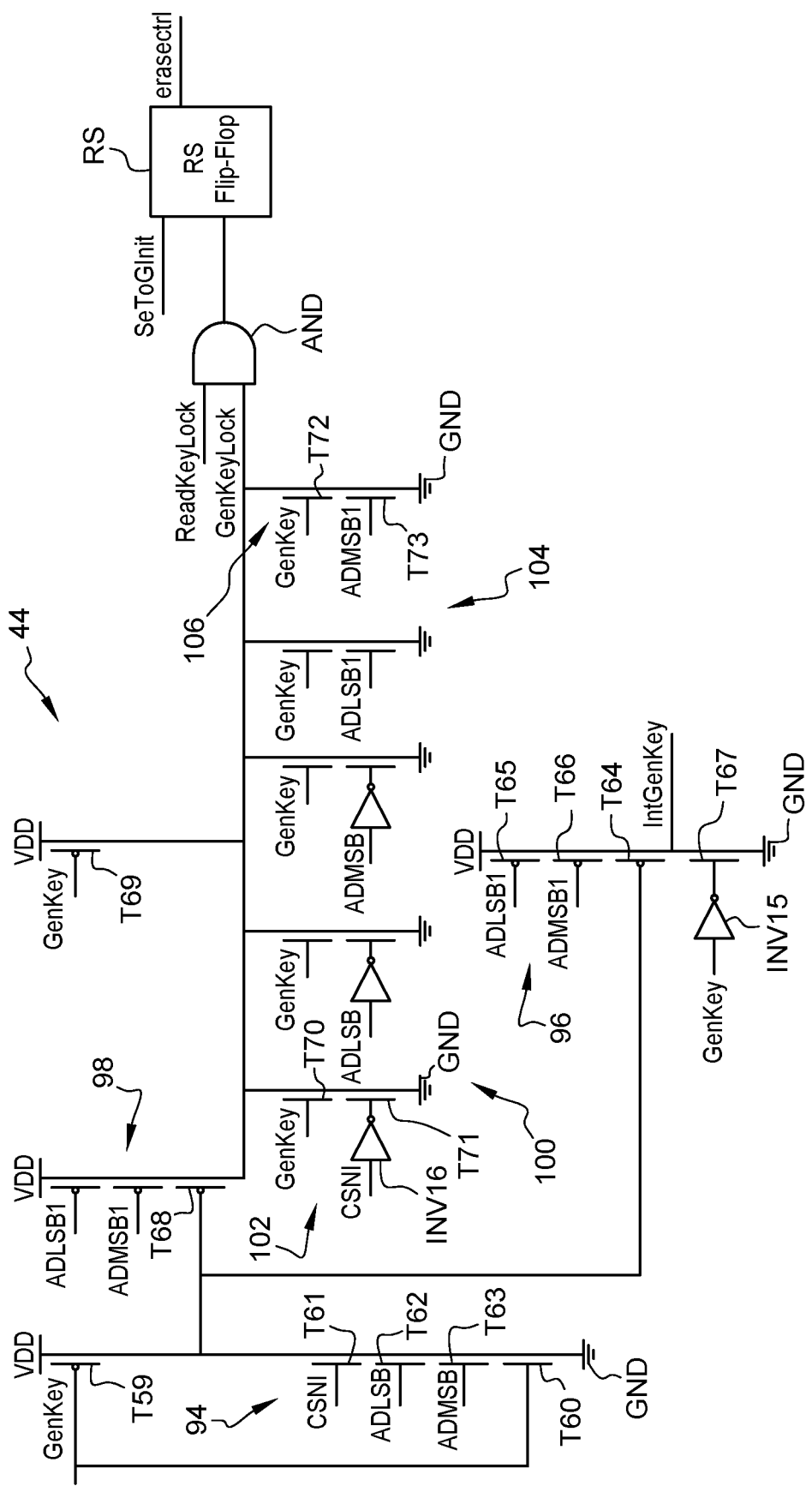
FIG. 22 shows a schematic block diagram of another portion of an embodiment of the memory of FIG. 4.
Figure 23:
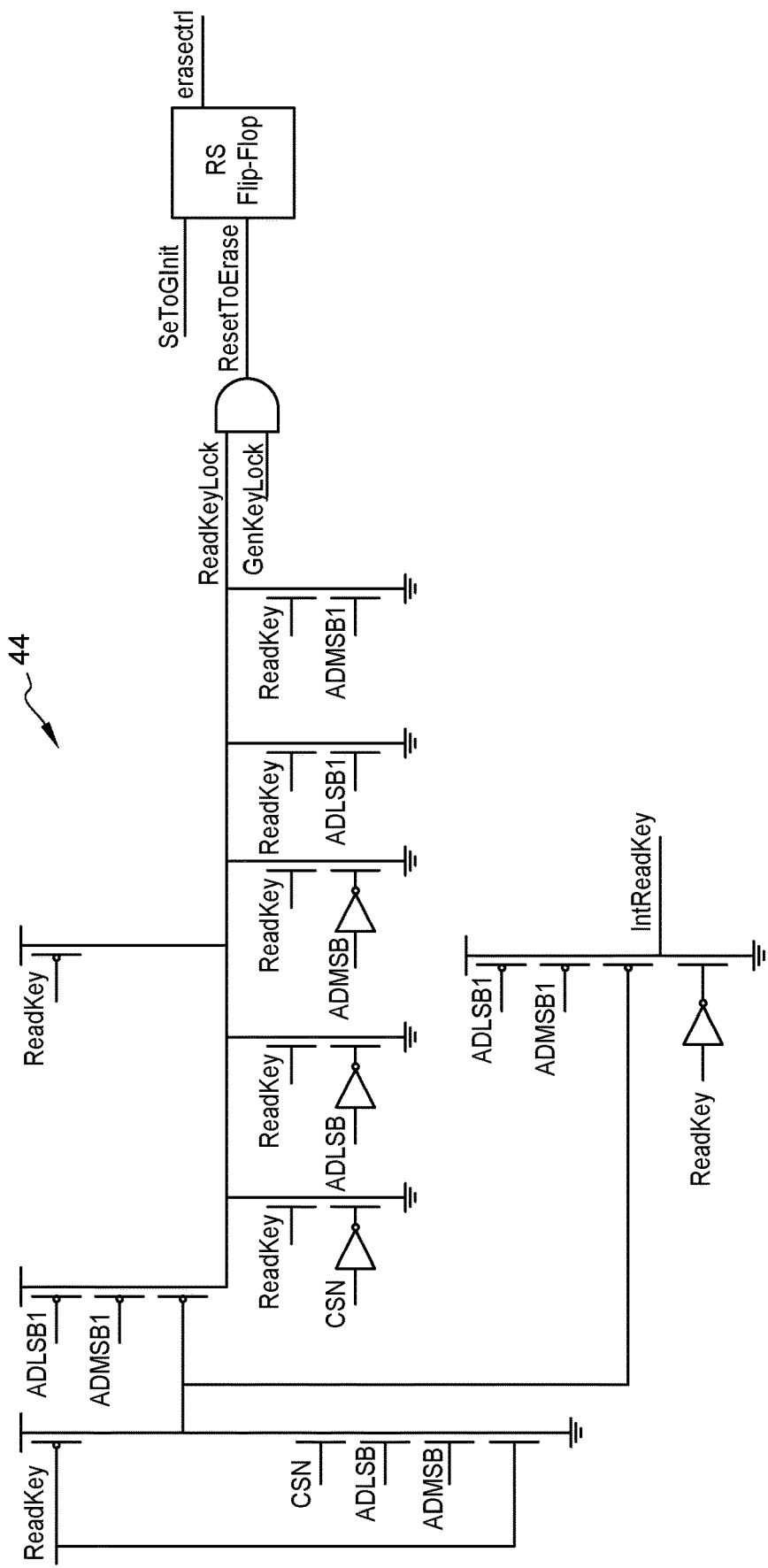
FIG. 23 shows a schematic block diagram of another portion of an embodiment of the memory of FIG. 4.

FIGS. 22 and 23 show an embodiment of a portion of security circuit respectively during a key generation operation and a key reading operation. Security circuit 44 will now be described in detail of a key generation operation in relation with FIG. 4. Security circuit 44 comprises: a P-channel MOS transistor T59 having its source connected to the source of high reference potential Vdd and having its gate receiving a binary input signal GenKey; an N-channel MOS transistor T60 having its source connected to the source of low reference potential GND and having its gate receiving binary signal GenKey; and a first group 94 of N-channel MOS transistors in series between the drain of transistor T59 and the drain of transistor T60, having their gates receiving first binary control signals. As an example, the first group 94 of N-channel MOS transistors is comprised of three N-channel MOS transistors T61, T62, T63 shown in FIGS. 22 and 23.

Security circuit 44 further comprises: a P-channel MOS transistor T64 having its gate connected to the drain of transistor T59 and having its drain delivering signal IntGenKey; a second group 96 of P-channel MOS transistors in series between the source of transistor T64 and the source of high reference potential VDD, and having their gates receiving second binary control signals. As an example, the second group 96 of P-channel MOS transistors may include two P-channel MOS transistors T65 and T66 as shown in FIGS. 22 and 23.

Security circuit 44 further comprises: an inverter INV15 having its input receiving signal GenKey; an N-channel MOS transistor T67 having its source coupled, preferably connected, to the source of low reference potential GND, having its drain coupled, preferably connected, to the drain of transistor T64, and having its gate connected to the output of inverter INV16; a P-channel MOS transistor T68 having its gate connected to the drain of transistor T59; and a P-channel MOS transistor T69 having its source coupled, preferably connected, to the source of high reference potential VDD, having its drain coupled, preferably connected, to the drain of transistor T68, and having its gate receiving signal GenKey.

Security circuit 44 further comprises: a third group 98 of P-channel MOS transistors in series between the source of transistor T68 and the source of high reference potential VDD, comprising the same number of transistors as second group 96, and having their gates controlled by the second signals for controlling second group 96; and a fourth group 100 of assemblies 102, the number of assemblies 102 of fourth group 100 being the same as the number of transistors of first group 94. Each assembly 100 comprises: an N-channel MOS transistor T70, having its drain coupled, preferably connected, to the drain of transistor T68, and having its gate receiving signal GenKey; an N-channel MOS transistor T71 having its source coupled, preferably connected to the source of low reference potential GND, and having its drain coupled, preferably connected, to the drain of transistor T70; and an inverter INV16 having its input receiving one of the first signals for controlling first group 94, and having its output connected to the gate of transistor T71.

Security circuit 44 further comprises: a fifth group 104 of assemblies 106, the number of assemblies 106 of fifth group 104 being the same as the number of transistors of second group 96. Each assembly 106 comprises: an N-channel MOS transistor T72, having its drain coupled, preferably connected, to the drain of transistor T68, and having its gate receiving signal GenKey; and an N-channel MOS transistor T73 having its source coupled, preferably connected, to the source of low reference potential GND, having its drain coupled, preferably connected, to the source of transistor T72, and having its gate receiving one of the second signals for controlling second group 96.

Security circuit 44 further comprises: a logic AND gate having a first input connected to the drain of transistor T68, and having a second input receiving a binary signal ReadKeyLock; and a RS flip-flop having its S input receiving a binary signal SetoGInit, having its R input connected to the output of the AND logic gate and having its output delivering signal erasectrl.

For a key generation operation, as illustrated in FIG. 22, the first binary signals for controlling first group 94 are signal CNSI, which is the inverse of signal CNS, signal ADLSB, which is, as an example, the least significant bit of digital signal AD, and signal ADMSB which is, as an example, the most significant bit of digital signal AD. The second binary signals for controlling second group 96 are signal ADLSB1, which is the bit which follows the least significant bit of digital signal AD, and signal ADMSB1, which is the bit which precedes the most significant bit of digital signal AD. Signal Out1 corresponds to signal IntGenKey.

As an example, with the circuit shown in FIG. 22, signal erasectrl remains at a logic "1" when the following conditions are simultaneously respected, and switches to a logic "0" if one of the following conditions is not respected: signal GenKey is at a logic "1"; signals CSNI, ADLSB, and ADMSB are at a logic "1"; and signals ADLSB1 and ADMSB1 are at a logic "0".

For a key reading operation, as illustrated in FIG. 23, security circuit 44 has the same structure as that shown in FIG. 21, with the difference being that signal GenKey is replaced with binary signal ReadKey, that signal CNSI, which is the inverse of signal CSN, is replaced with signal CNS, and that signal IntGenKey is replaced with signal IntReadKey.

Various embodiments and variants have been described. Those skilled in the art will understand that certain features of these various embodiments and variants may be combined, and other variants will occur to those skilled in the art. In particular, although embodiments have been described for a RAM, it should be clear that the embodiments relative to the encryption of data written into the memory, the decryption of data read from the memory, and the generation of a key, may be implemented with a ROM.

Finally, the practical implementation of the described embodiments and variations is within the abilities of those skilled in the art based on the functional indications given hereabove.

The invention claimed is:

1. A memory, comprising:
 memory cells arranged in rows and columns;
 at least one bit line for each column coupled to the memory cells of the column; and
 a read/write circuit coupled to the bit lines and comprising, for each column, a detection circuit configured to detect a logic level of the bit line for that column and deliver a read binary datum which depends on said logic level, wherein the read/write circuit is configured to receive, for each column, a binary datum to be stored in one of the memory cells of the column, and wherein, for each column, an operation of reading an encrypted binary datum stored in one of the memory cells of that column includes selection of said one of the memory cells and, after selection of that memory cell, reading by the detection circuit the level of the bit line after elapse of a first time period;
 wherein the read/write circuit comprises, for each column:
  a latch configured to store a bit of a key; and
  an encryption circuit configured to encrypt the received binary datum with the bit of the key to thereby provide an encrypted binary datum;
  wherein the read/write circuit is configured to control the bit line for that column to store the encrypted binary datum;
 wherein the read/write circuit is configured, for at least one of the columns, to store a bit of the key in the latch associated with that column, the bit of the key corresponding to the read binary datum delivered by the detection circuit after elapse of a second time period shorter than the first time period.

2. The memory according to claim 1, wherein the read/write circuit is configured, for each column, on request, to decrypt the encrypted datum stored in one of the memory cells of that column and deliver the decrypted binary datum.

3. The memory according to claim 1, wherein the read/write circuit is configured, for each column, on request, to directly deliver the encrypted binary datum stored in one of the memory cells of that column.

4. The memory according to claim 1, wherein the read/write circuit is configured, for each column, to deliver, on request, the bit of the key stored in the latch associated with that column.

5. A memory, comprising:
 memory cells arranged in rows and columns;
 at least one bit line for each column coupled to the memory cells of the column; and
 a read/write circuit coupled to the bit lines, the read/write circuit configured to receive, for each column, a binary datum to be stored in one of the memory cells of the column;
 wherein the read/write circuit comprises, for each column:
  a latch configured to store a bit of a key; and
  an encryption circuit configured to encrypt the received binary datum with the bit of the key to thereby provide an encrypted binary datum;
 wherein the read/write circuit is configured to control the bit line for that column to store the encrypted binary datum; and
 wherein the read/write circuit is configured, for at least one of the columns, to store a bit of the key in the latch associated with that column at powering on of the memory, the bit of the key corresponding to binary datum stored in one of the memory cells of that column at the powering on of the memory.

6. The memory according to claim 5, wherein the read/write circuit is configured, for each column, on request, to decrypt the encrypted datum stored in one of the memory cells of that column and deliver the decrypted binary datum.

7. The memory according to claim 5, wherein the read/write circuit is configured, for each column, on request, to directly deliver the encrypted binary datum stored in one of the memory cells of that column.

8. The memory according to claim 5, wherein the read/write circuit is configured, for each column, to deliver, on request, the bit of the key stored in the latch associated with that column.

9. A memory, comprising:
 memory cells arranged in rows and columns;
 at least one bit line for each column coupled to the memory cells of the column; and
 a read/write circuit coupled to the bit lines, the read/write circuit configured to receive, for each column, a binary datum to be stored in one of the memory cells of the column;
 wherein the read/write circuit comprises, for each column:
  a latch configured to store a bit of a key; and
  an encryption circuit configured to encrypt the received binary datum with the bit of the key to thereby provide an encrypted binary datum;
 wherein the read/write circuit is configured to control the bit line for that column to store the encrypted binary datum; and
 wherein each column comprises sub-columns of memory cells, wherein, during a write operation, the binary datum received for each column is encrypted and the encrypted binary datum is stored in a memory cell of one of the sub-columns.

10. The memory according to claim 9, wherein, during the write operation, the read/write circuit is configured to use one of the bit of the key and an inverse of the bit of the key to encrypt the received binary datum when the sub-column containing the memory cell is of odd rank, and to use the other one of the bit of the key and the inverse of the bit of the key to encrypt the received binary datum when the sub-column containing the memory cell is of even rank.

11. The memory according to claim 9, wherein the read/write circuit comprises, for each column, an additional latch configured to store a bit of an additional key; and wherein, during the write operation, the read/write circuit is configured to use one of the bit of the key and the bit of the additional key to encrypt the received binary datum when the sub-column containing the memory cell is of odd rank, and to use the other one of the bit of the key and the bit of the additional key to encrypt the received binary datum when the sub-column containing the memory cell is of even rank.

12. The memory according to claim 9,
wherein the rows of memory cells are arranged in first rows and in second rows;
wherein the read/write circuit comprises, for each column, an additional latch configured to store a bit of an additional key; and
wherein, during the write operation, the read/write circuit uses:
one of the bit of the key, the bit of the additional key, an inverse of the bit of the key, and an inverse of the bit of the additional key to encrypt the received binary datum when the sub-column containing the memory cell is of odd rank and a selected row is one of the first rows;
another one of the bit of the key, the bit of the additional key, the inverse of the bit of the key, and the inverse of the bit of the additional key to encrypt the received binary datum when the sub-column containing the memory cell is of even rank and the selected row is one of the first rows;
another one of the bit of the key, the bit of the additional key, the inverse of the bit of the key, and the inverse of the bit of the additional key to encrypt the received binary datum when the sub-column containing the memory cell is of odd rank and the selected row is one of the second rows; and
another one of the bit of the key, the bit of the additional key, the inverse of the bit of the key, and the inverse of the bit of the additional key to encrypt the received binary datum when the sub-column containing the memory cell is of even rank and the selected row is one of the second rows.

13. A memory, comprising:
memory cells arranged in rows and columns;
at least one bit line for each column coupled to the memory cells of the column; and
a read/write circuit coupled to the bit lines, the read/write circuit configured to receive, for each column, a binary datum to be stored in one of the memory cells of the column;
wherein the read/write circuit comprises, for each column:
a latch configured to store a bit of a key; and
an encryption circuit configured to encrypt the received binary datum with the bit of the key to thereby provide an encrypted binary datum;
wherein the read/write circuit is configured to control the bit line for that column to store the encrypted binary datum; and
wherein each latch comprises a first three-state inverter, an inverter in series with the first three-state inverter, and a second three-state inverter in antiparallel with the inverter.

14. The memory according to claim 13, wherein the read/write circuit is configured, for each column, on request, to decrypt the encrypted datum stored in one of the memory cells of that column and deliver the decrypted binary datum.

15. The memory according to claim 13, wherein the read/write circuit is configured, for each column, on request, to directly deliver the encrypted binary datum stored in one of the memory cells of that column.

16. The memory according to claim 13, wherein the read/write circuit is configured, for each column, to deliver, on request, the bit of the key stored in the latch associated with that column.

17. A method for storing data into a memory comprising memory cells arranged in rows and in columns, at least one bit line for each column coupled to the memory cells of the column, and a read/write circuit coupled to the bit lines, the method comprising:
receiving at the read/write circuit, for each column, a binary datum to be stored in one of the memory cells of that column;
storing a bit of a key in a latch for each column;
encrypting the received binary datum using encryption circuitry with the bit of the key to provide an encrypted binary datum;
for each column, using a detection circuit to detect a logic level of the bit line for that column to deliver a read binary datum which depends on said logic level;
for each column, performing an operation of reading an encrypted binary datum stored in one of the memory cells of that column, said operation including selection of said one of the memory cells and, after selection of that memory cell, use of the detection circuit to read the level of the bit line after a first time period elapses; and
for at least one of the columns, using the read/write circuit to store a bit of the key in the latch associated with that column, the bit of the key corresponding to the read binary datum delivered by the detection circuit after elapse of a second time period shorter than the first time period.

18. The method according to claim 17, further comprising for each column, on request, using the read/write circuit to decrypt the encrypted datum stored in one of the memory cells of that column and deliver the decrypted binary datum.

19. The method according to claim 17, further comprising for each column, on request, using the read/write circuit to directly deliver the encrypted binary datum stored in one of the memory cells of that column.

20. The method according to claim 17, further comprising, for each column, on request, using the read/write circuit to deliver the bit of the key stored in the latch associated with that column.

21. A method, for storing data into a memory comprising memory cells arranged in rows and in columns, at least one bit line for each column coupled to the memory cells of the column, and a read/write circuit coupled to the bit lines, the method comprising:
receiving at the read/write circuit, for each column, a binary datum to be stored in one of the memory cells of that column;
storing a bit of a key in a latch for each column;
encrypting the received binary datum using encryption circuitry with the bit of the key to provide an encrypted binary datum; and
for at least one of the columns, using the read/write circuit to store a bit of the key in the latch associated with that column at powering on of the memory, the bit of the key corresponding to binary datum stored in one of the memory cells of that column at the powering on of the memory.

22. The method according to claim 21, further comprising for each column, on request, using the read/write circuit to decrypt the encrypted datum stored in one of the memory cells of that column and deliver the decrypted binary datum.

23. The method according to claim 21, further comprising for each column, on request, using the read/write circuit to directly deliver the encrypted binary datum stored in one of the memory cells of that column.

24. The method according to claim 21, further comprising, for each column, on request, using the read/write circuit to deliver the bit of the key stored in the latch associated with that column.

25. A method, for storing data into a memory comprising memory cells arranged in rows and in columns, at least one bit line for each column coupled to the memory cells of the column, and a read/write circuit coupled to the bit lines, the method comprising:
  receiving at the read/write circuit, for each column, a binary datum to be stored in one of the memory cells of that column;
  storing a bit of a key in a latch for each column; and
  encrypting the received binary datum using encryption circuitry with the bit of the key to provide an encrypted binary datum;
  wherein, during a write operation, the binary datum received for each column is encrypted and the encrypted binary datum is stored in a memory cell of a sub-column of the memory.

26. The method according to claim 25, further comprising, during a write operation, causing the read/write circuit to use one of the bit of the key and the inverse of the bit of the key to encrypt the received binary datum when the sub-column is of odd rank, and to use the other one of the bit of the key and of the inverse of the bit of the key to encrypt the received binary datum when the sub-column is of even rank.

27. The method according to claim 25, further comprising, for each column, causing an additional latch in the read/write circuit to store a bit of an additional key; and further comprising, during a write operation, causing the read/write circuit to use one of the bit of the key and of the bit of the additional key to encrypt the received binary datum when the sub-column is of odd rank, and to use the other one of the bit of the key and of the bit of the additional key to encrypt the received binary datum when the sub-column is of even rank.

28. The method according to claim 25, wherein the rows of memory cells are arranged in first rows and in second rows; further comprising, for each column, causing an additional latch in the read/write circuit to store a bit of an additional key; and
  further comprising, during a write operation, causing the read/write circuit to use:
    one of the bit of the key, the bit of the additional key, the inverse of the bit of the key, and the inverse of the bit of the additional key to encrypt the received binary datum when the sub-column is of odd rank and a selected row is one of the first rows;
    another one of the bit of the key, the bit of the additional key, the inverse of the bit of the key, and the inverse of the bit of the additional key to encrypt the received binary datum when the sub-column is of even rank and the selected row is one of the first rows;
    another one of the bit of the key, the bit of the additional key, the inverse of the bit of the key, and the inverse of the bit of the additional key to encrypt the received binary datum when the sub-column is of odd rank and the selected row is one of the second rows; and
    another one of the bit of the key, the bit of the additional key, the inverse of the bit of the key, and the inverse of the bit of the additional key to encrypt the received binary datum when the sub-column is of even rank and the selected row is one of the second rows.

* * * * *